US010990768B2

(12) United States Patent
Tu et al.

(10) Patent No.: US 10,990,768 B2
(45) Date of Patent: Apr. 27, 2021

(54) METHOD AND DEVICE FOR TRANSLATING OBJECT INFORMATION AND ACQUIRING DERIVATIVE INFORMATION

(71) Applicant: Samsung Electronics Co., Ltd., Gyeonggi-do (KR)

(72) Inventors: Mei Tu, Beijing (CN); Heng Yu, Beijing (CN)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 15/483,649

(22) Filed: Apr. 10, 2017

(65) Prior Publication Data

US 2017/0293611 A1   Oct. 12, 2017

(30) Foreign Application Priority Data

Apr. 8, 2016 (CN) .......................... 201610218223.4

(51) Int. Cl.
 *G06F 40/58* (2020.01)
 *G06F 16/48* (2019.01)
  (Continued)

(52) U.S. Cl.
 CPC ............ *G06F 40/58* (2020.01); *G06F 3/0482* (2013.01); *G06F 3/0484* (2013.01);
  (Continued)

(58) Field of Classification Search
 CPC ...... G06F 17/289; G06F 16/438; G06F 16/48; G06F 3/0482; G06F 3/0484; G06K 9/00; G06T 2201/0051; G06T 2207/10016
 See application file for complete search history.

(56) References Cited

U.S. PATENT DOCUMENTS 5,111,516 A * 5/1992 Nakano ................ G06K 9/6211
                                                              382/156
6,185,329 B1 * 2/2001 Zhang .................. G06K 9/3266
                                                              358/462
(Continued)

FOREIGN PATENT DOCUMENTS

CN    101620680    1/2010
CN    102084417    6/2011
(Continued)

OTHER PUBLICATIONS

International Search Report dated Jul. 20, 2017 issued in counterpart application No. PCT/KR2017/003875, 3 pages.
(Continued)

*Primary Examiner* — Fariba Sirjani
(74) *Attorney, Agent, or Firm* — The Farrell Law Firm, P.C.

(57) ABSTRACT

A method and device are provided for translating object information and acquiring derivative information, including obtaining, based on the acquired source-object information, target-object information corresponding to the source object by translation, and outputting the target-object information. A language environment corresponding to the source object is different from a language environment corresponding to the target object. By applying the present disclosure, the range of machine translation subjects can be expanded, and the applicability of translation can be enhanced, a user's requirements on translation of objects can be met.

20 Claims, 35 Drawing Sheets

(51) Int. Cl.
*G06F 16/438* (2019.01)
*G06F 16/9535* (2019.01)
*G06F 3/0482* (2013.01)
*G06F 3/0484* (2013.01)

(52) U.S. Cl.
CPC ............ *G06F 16/438* (2019.01); *G06F 16/48* (2019.01); *G06F 16/9535* (2019.01)

(56) References Cited

U.S. PATENT DOCUMENTS

| | | | |
|---|---|---|---|
| 6,804,416 B1* | 10/2004 | Bachelder | G06K 9/6253 345/651 |
| 6,904,160 B2* | 6/2005 | Burgess | G06F 16/29 382/113 |
| 8,085,982 B1* | 12/2011 | Kim | G06K 9/00261 382/100 |
| 9,020,918 B2* | 4/2015 | Ikenoue | G06F 17/30011 707/705 |
| 9,037,450 B2* | 5/2015 | Vukosavljevic | G06F 17/211 704/2 |
| 9,053,483 B2* | 6/2015 | Geisner | G02B 27/017 |
| 9,268,734 B1* | 2/2016 | Ward | G06F 15/0291 |
| 9,424,107 B1* | 8/2016 | Ward | G06F 9/542 |
| 9,477,637 B1* | 10/2016 | Ward | G06F 17/00 |
| 9,489,775 B1* | 11/2016 | Bell | G01S 17/89 |
| 9,619,998 B2* | 4/2017 | Takamura | G06Q 50/01 |
| 9,773,197 B2* | 9/2017 | Englund | G06K 9/78 |
| 9,800,950 B2* | 10/2017 | Grevers, Jr. | H04N 21/812 |
| 2001/0012395 A1* | 8/2001 | Michael | G06K 9/00 382/152 |
| 2001/0032070 A1* | 10/2001 | Teicher | G06F 17/28 704/2 |
| 2002/0174025 A1* | 11/2002 | Hind | G06Q 30/0601 705/26.1 |
| 2002/0175930 A1* | 11/2002 | Kolde | H04N 5/44513 715/705 |
| 2003/0097250 A1* | 5/2003 | Chino | G06F 3/04883 704/1 |
| 2003/0101043 A1* | 5/2003 | Boegelund | G06F 40/58 704/3 |
| 2003/0164819 A1* | 9/2003 | Waibel | G06K 9/228 345/173 |
| 2003/0202683 A1* | 10/2003 | Ma | G08G 1/096725 382/104 |
| 2004/0205545 A1* | 10/2004 | Bargeron | G06F 17/241 715/205 |
| 2005/0044015 A1* | 2/2005 | Bracken | G06Q 40/00 705/30 |
| 2006/0038833 A1* | 2/2006 | Mallinson | A63F 13/02 345/633 |
| 2006/0083431 A1* | 4/2006 | Bliss | G06K 9/72 382/229 |
| 2006/0200335 A1* | 9/2006 | Itonori | G06F 17/289 704/2 |
| 2006/0215911 A1* | 9/2006 | Ashikaga | G06F 17/30011 382/190 |
| 2006/0217955 A1* | 9/2006 | Nagao | G06F 17/289 704/2 |
| 2006/0285748 A1* | 12/2006 | Tateno | G06F 17/275 382/181 |
| 2007/0225964 A1* | 9/2007 | Wu | G06F 40/58 704/2 |
| 2008/0039120 A1* | 2/2008 | Gad | G01C 21/20 455/456.2 |
| 2008/0040096 A1* | 2/2008 | Osada | G06F 17/2827 704/3 |
| 2008/0103769 A1 | 5/2008 | Schultz et al. | |
| 2008/0233980 A1* | 9/2008 | Englund | G06F 17/289 455/466 |
| 2008/0243473 A1* | 10/2008 | Boyd | G06F 17/289 704/2 |
| 2008/0300859 A1* | 12/2008 | Chen | G06F 9/543 704/7 |
| 2009/0112572 A1* | 4/2009 | Thorn | G06F 3/038 704/3 |
| 2009/0138379 A1* | 5/2009 | Scheman | G06Q 30/06 705/26.1 |
| 2009/0198486 A1* | 8/2009 | Chang | G06F 17/289 704/2 |
| 2009/0285445 A1* | 11/2009 | Vasa | G01C 21/26 382/100 |
| 2010/0036653 A1* | 2/2010 | Kim | G06F 40/58 704/3 |
| 2010/0250126 A1* | 9/2010 | Epshtein | G01C 21/3602 701/438 |
| 2011/0293183 A1* | 12/2011 | Tan | G06K 9/00993 382/182 |
| 2012/0099756 A1* | 4/2012 | Sherman | G07G 1/0063 382/100 |
| 2012/0109632 A1* | 5/2012 | Sugiura | G06F 17/289 704/3 |
| 2012/0330646 A1* | 12/2012 | Andrade | G06F 17/289 704/7 |
| 2013/0036438 A1* | 2/2013 | Kutaragi | H04N 21/2541 725/38 |
| 2013/0076788 A1* | 3/2013 | Ben Zvi | G06F 16/951 345/633 |
| 2013/0085345 A1* | 4/2013 | Geisner | G02B 27/017 600/300 |
| 2013/0211814 A1* | 8/2013 | Derks | G06Q 50/12 704/2 |
| 2014/0056475 A1* | 2/2014 | Jang | G06K 9/18 382/103 |
| 2014/0180867 A1* | 6/2014 | Zises | G06Q 30/0631 705/26.7 |
| 2014/0368691 A1* | 12/2014 | Boncyk | G06F 3/017 348/222.1 |
| 2015/0081620 A1* | 3/2015 | Reddy | G06F 17/30566 707/602 |
| 2015/0095191 A1* | 4/2015 | Hu | G06Q 30/0613 705/26.41 |
| 2015/0310539 A1* | 10/2015 | McCoy | G06Q 30/0623 705/27.1 |
| 2015/0370785 A1* | 12/2015 | Mauser | G06F 17/289 704/7 |
| 2016/0012136 A1* | 1/2016 | Ben Zvi | G06F 16/9537 707/770 |
| 2016/0063339 A1* | 3/2016 | Kwon | G06K 9/2081 382/229 |
| 2016/0171339 A1* | 6/2016 | Choi | G06K 9/6293 382/103 |
| 2017/0220259 A1* | 8/2017 | Choi | G06F 3/0605 |
| 2017/0220562 A1* | 8/2017 | Yamauchi | G06F 17/2827 |
| 2017/0255614 A1* | 9/2017 | Vukosavljevic | G06F 17/211 |
| 2017/0293611 A1* | 10/2017 | Tu | G06F 16/9535 |
| 2018/0018544 A1* | 1/2018 | Englund | G06K 9/78 |
| 2019/0102382 A1* | 4/2019 | Rosart | G06F 17/211 |
| 2020/0272485 A1* | 8/2020 | Karashchuk | G06F 3/04842 |

FOREIGN PATENT DOCUMENTS

| | | |
|---|---|---|
| CN | 104090871 | 10/2014 |
| JP | 2003-196541 | 7/2003 |
| WO | WO 2014-195903 | 12/2014 |

OTHER PUBLICATIONS

Chinese Office Action dated Mar. 11, 2020 issued in counterpart application No. 201610218223.4, 40 pages.

* cited by examiner

Derivative information:
Dosage:
For an adult : 30 ml per 4 hours :
For a child : 15 ml per 4 hours Set an alarm clock?
· Adult
· Kid
· Cancel Starting time: 8:00
Ending time: 20:00
Days for repetition: 7
Time interval: 4 hours

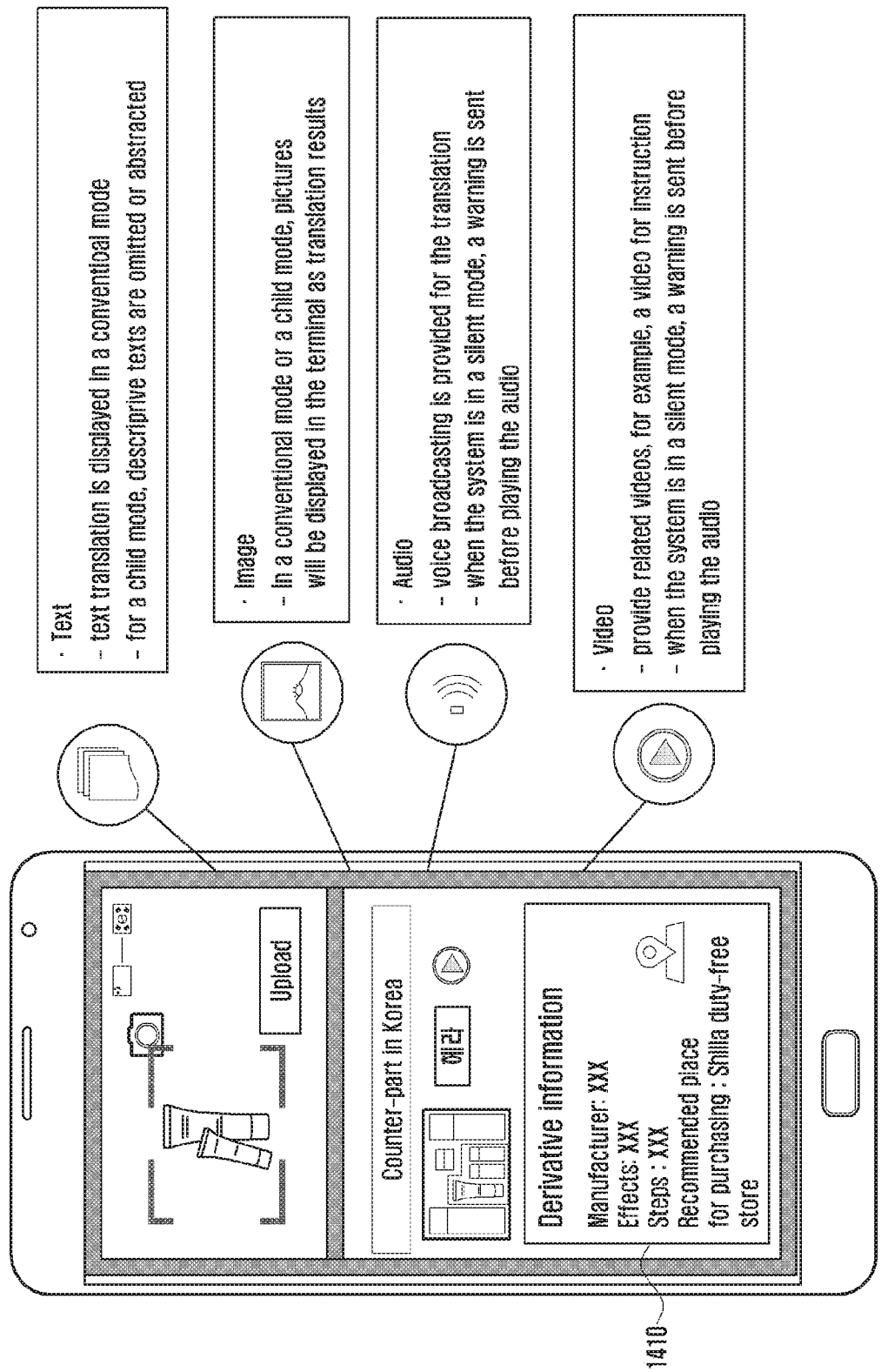

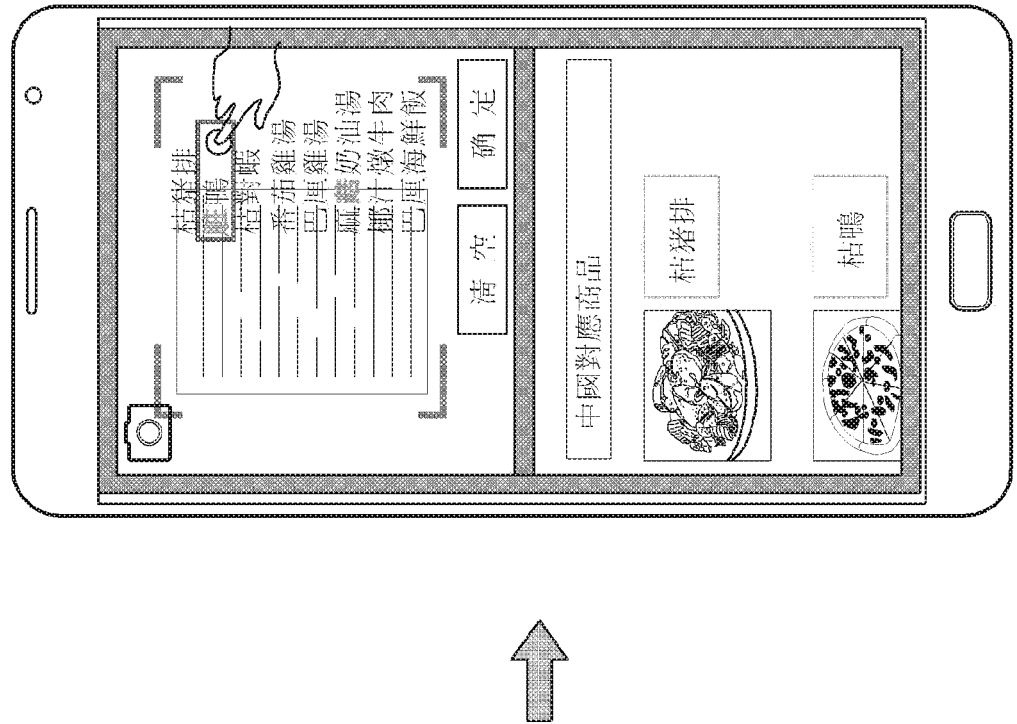
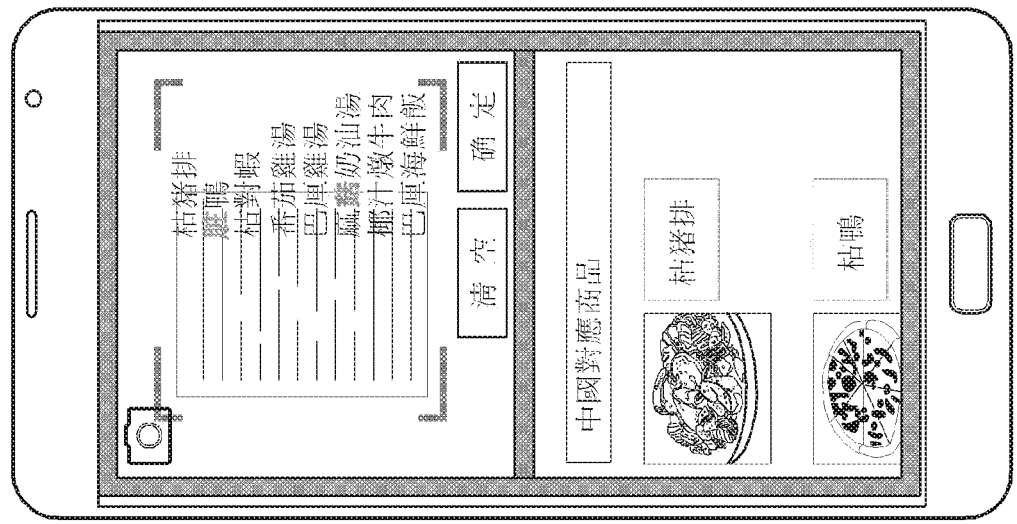
FIG. 24A
FIG. 24B

METHOD AND DEVICE FOR TRANSLATING OBJECT INFORMATION AND ACQUIRING DERIVATIVE INFORMATION

PRIORITY

This application claims priority under 35 U.S.C. § 119(a) to a Chinese Patent Application filed in the Chinese Patent Office on Apr. 8, 2016 and assigned Serial No. 201610218223.4, the content of which is incorporated herein by reference.

BACKGROUND

1. Field of the Disclosure

The present disclosure relates generally to translation, and more particularly, to a method and device for translating object information and acquiring derivative information.

2. Description of the Related Art

Machine translation technologies involve one language being automatically translated into another language. When compared with human translation, machine translation has advantages such as high translation efficiency, low cost for learning and translating, and ease of expansion to other languages. Thus, with the booming development of industries such as international economy, trade and tourism, machine translation technologies enhance the convenience for a user during international communication, and are increasingly important in international communication.

According to differences in algorithm frameworks of machine translation, at present, machine translation technologies can be generally divided into the following three types:

1) Rule-Based Machine Translation

Linguists write translation rules, handle rule conflicts, and maintain a rule database. When a sentence is input, a translation is generated according to the translation rules.

2) Statistical Machine Translation

According to parallel corpora, word alignment between parallel sentence pairs is automatically learned, a translation rule is automatically extracted and a translation probability is estimated, and a translation model is established and parameters thereof are adjusted and optimized. When a sentence is input, N translation candidates are generated according to the translation rules, the translation candidates are graded and ranked according to a translation model and a language model, and the translation ranked first is selected as the final translation.

3) Neural Network Machine Translation

According to the method for training a parallel corpus and a circular neural network, a network parameter is automatically learned. When one sentence is input, a translation is automatically generated according to a network structure.

However, according to the difference in the subjects input during machine translation, at present, machine translation technologies can be divided into the following types:

1) Text Machine Translation

Machine translation is directly performed on a text input by a user.

2) Speech Machine Translation

When a speech input signal is detected, voice recognition is performed, a corresponding text is generated, and machine translation is performed on the text.

3) Image Machine Translation

When input of a picture is detected, optical character recognition is performed on the picture to obtain the text in the picture, and machine translation is performed on the text.

Generally, the existing machine translation technologies only concern the translation operation itself, so that the user inputs are translated as they are, i.e., as text translations. Such an incomplete manner of translation falls short of meeting a user's actual requirements since the translation subjects are texts only, including texts recognized from voice or extracted from pictures. The translation of texts only may not enable a user to fully understand the translated subjects, thereby leaving the user's translation requirements unfulfilled.

As such, there is a need in the art for a method and apparatus for translating not just texts, but also an object, in order to satisfy current needs of users.

SUMMARY

The present disclosure has been made to address the above-mentioned shortcomings in the art and to provide the advantages described below.

Accordingly, an aspect of the present disclosure is to provide a method and device for translating object information and acquiring derivative information in order to expand the range of machine translation subjects, enhance the applicability of translation and meet a user's requirements on translation of objects.

According to an aspect of the present disclosure, a method for translating object information includes obtaining, based on the acquired source-object information, target-object information corresponding to the source object by translation, and outputting the target-object information.

According to another aspect of the present disclosure, a device for translating object information is provided. The device includes an object information translation unit, configured to obtain, based on the acquired source-object information, target-object information corresponding to the source object by translation, and an information output unit, configured to output target-object information obtained by the object information translation unit by translation.

According to another aspect of the present disclosure, a device for acquiring derivative information is provided. The device includes a derivative information acquisition unit, configured to determine, based on the acquired object information, derivative information associated with the object, and an information output unit, configured to output the derivative information determined by the derivative information acquisition unit.

According to another aspect of the present disclosure, a method for acquiring derivative information includes determining, based on the acquired object information, derivative information associated with the object, and outputting the determined derivative information.

According to another aspect of the present disclosure, a device for translating object information includes an object information translation unit, configured to obtain, based on the acquired source-object information, target-object information corresponding to the source object by translation, and an information output unit, configured to output the target-object information obtained by the object information translation unit by translation.

According to another aspect of the present disclosure, a device for acquiring derivative information includes a derivative information acquisition unit, configured to determine, based on the acquired object information, derivative information associated with the object, and an information output unit, configured to output the derivative information determined by the derivative information acquisition unit.

BRIEF DESCRIPTION OF THE DRAWINGS

The above and other aspects, features, and advantages of certain embodiments of the present disclosure will be more apparent from the following detailed description taken in conjunction with the accompanying drawings, in which:

FIG. 14A and FIG. 14B illustrate multi-modal output according to the fifth embodiment of the present disclosure;

FIG. 24A, FIG. 24B, and FIG. 24C illustrate dish translation according to another specific embodiment of the seventh embodiment of the present disclosure;

DETAILED DESCRIPTION OF EMBODIMENTS OF THE PRESENT DISCLOSURE

Embodiments of the present disclosure will be described hereinafter with reference to the accompanying drawings. The embodiments are merely examples of the embodiments of the present disclosure, and are not limited thereto. Descriptions of well-known functions and/or configurations will be omitted for the sake of clarity and conciseness.

Herein, terms such as "module" and "device" are intended to include entities related to a computer, such as hardware, firmware, a combination of software and hardware, software, or software in execution. For example, a module can be, but is not limited to, a process running on a processor, a processor, a subject, an executable program or thread, a program and/or a computer. For example, both of the applications operating on a computing apparatus and the computing apparatus can be a module. One or more modules can be located in one process and/or thread in execution, and one module can be located in a computer, and/or can be distributed between two or more computers.

In the conventional translation art, although the input subjects can be texts, voice or pictures, the translation subjects are only texts, such as those recognized from voice or extracted from images. By translating texts only, a user may be unable to understand the translated subjects. For example, it is difficult for a user to comprehend drug names in foreign drugstores, or commodity names with distinct local characteristics in foreign stores, without accompanying objects being translated. In addition, in some instances, the content to be translated may not include any text, such as on billboards that a user may encounter in travel. Therefore, translation of texts only does not provide full translation, and a user's requirements on translation are unfulfilled.

Accordingly, based on the acquired source-object information, the present disclosure provides that target-object information corresponding to the source object can be obtained by translation. For example, a source object to be translated can be recognized based on the acquired source-object information, and corresponding target-object information is obtained for the recognized source object by translation, and is output. Foreign source objects with which a user is unfamiliar, such as drugs, foods, cosmetics and road signs, can be translated into corresponding domestic target objects with which a user is familiar. The translation orientation can also be exchanged to translate the domestic source objects into corresponding target objects of particular countries. A user's requirements on translation of objects can be met, the range of machine translation subjects can be expanded, and the applicability of translation can be enhanced.

First Embodiment

Figure 1:
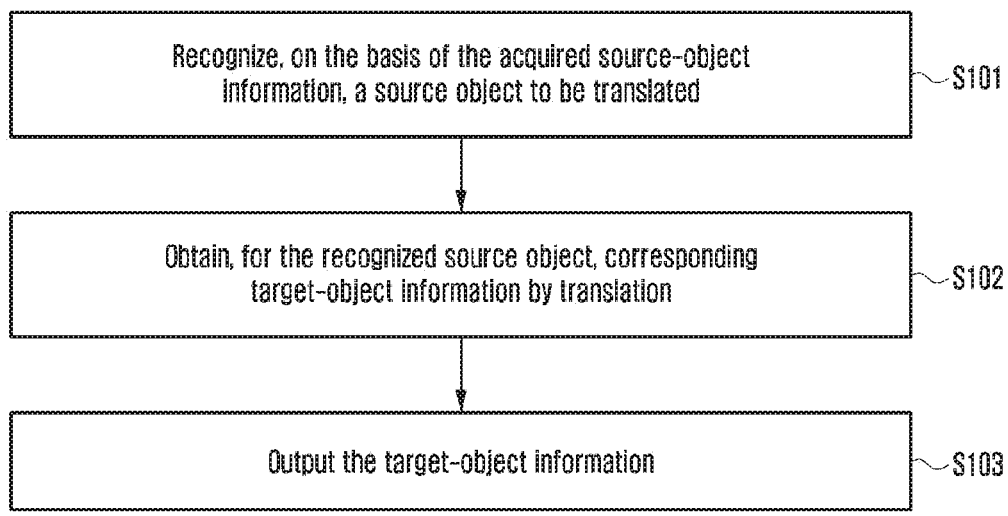
FIG. 1 illustrates a method for translating object information according to a first embodiment of the present disclosure.

FIG. 1 illustrates a method for translating object information according to a first embodiment of the present disclosure.

In step S101, a source object to be translated is recognized based on the acquired source-object information.

In the present disclosure, "object" refers to an entity whose form can be captured by a sensor and which can be described by a language. In addition, an object to be translated can be referred to as a source object, and the translated object can be referred to as a target object. There may be one or more source objects to be translated. When there is a plurality of source objects, the source objects can be of an identical type or of different types. Solutions for translating a single source object and a plurality of source objects will be respectively described below in the second embodiment.

The source-object information regards a source object, and can include at least one of text, pictures, audio, and video.

In actual applications, source-object information can be directly acquired by a terminal, such as by shooting by a camera. The transferred source-object information can also be acquired from the Internet or other apparatuses. The acquired source-object information can include at least one of multimedia information corresponding to a source object, text information recognized from the multimedia information corresponding to a source object, location information corresponding to a source object, searched related information of a source object, and related information of a source object input by a user.

When the source-object information includes the multimedia information corresponding to the source object, the source-object information can be acquired by collecting the multimedia information in real time by a multimedia collection apparatus, and using the multimedia information collected in real time as the source-object information.

The multimedia information corresponding to the source object can include, but is not limited to, at least one of object image, object audio information, and object video information.

The searched related information of a source object, included in the source-object information, can be information regarding the source object searched from the network side. For example, when a recognition result is inaccurate, or when the source-object information is incomplete, the related information can be searched from the network side or from locally stored sources, or a user is prompted to input the related information of a source object in order to accurately recognize a source object to be translated.

The location information corresponding to the source object, included in the source-object information, can be used to optimize a processing model, such as an object alignment model for translation, so that a more accurate translation result can be obtained according to the location information.

The source-object information can further include personal information of a user, based on which personalized translation can be subsequently performed.

A terminal includes a smart phone, a portable android device (PAD) and other mobile apparatuses, a smart watch, smart glasses and other wearable apparatuses.

After the source-object information is acquired, based on the acquired source-object information, an image feature and/or a text feature can be extracted, and a source object to be translated is recognized according to the extracted image feature and/or text feature. For example, the source object to be translated can be recognized according to a preset object recognition model and the extracted image feature and/or text feature.

The object recognition model is established in advance, and can be specifically established by collecting, for a plurality of preset sampled objects, multi-modal data of each sampled object, extracting the image feature and/or the text feature of the sampled object from the multi-modal data, and obtaining, based on the image feature and/or the text feature of the sampled object, an object recognition model by learning and training.

The multi-modal data of the sampled object includes at least one of text, pictures, audio, and video, which are related to the sampled object.

An object recognition model can be established in advance by obtaining, for each object type, the object recognition model corresponding to the object type by training, based on the image feature and/or the text feature of each sampled object belonging to the object type.

After the image feature and/or the text feature is/are extracted based on the acquired source-object information, an object type of the source object to be translated can be recognized according to the extracted image feature and/or text feature, and a source object to be translated is recognized according to the object recognition model corresponding to that object type and the extracted image feature and/or text feature.

The quality of machine translation significantly depends upon the normalization degree of the input texts and the size of the database and model. Thus, the existing commercial machine translation technologies generally require support from network and cloud services, and normalized processing on texts. However, the existing machine translation technologies do not consider many extreme conditions, such as constrained network, inadequate electric power of an apparatus, and incomplete input text/voice/image information.

Thus, the present disclosure can provide a solution for optimizing the method for translating object information in extreme conditions, including handling incomplete input object information, saving traffic and electric power, and outputting translation of object information by an apparatus in different conditions, as will be described in detail in the seventh embodiment of the present disclosure.

The present disclosure considers that a scene with incomplete information may cause the inability to recognize a source object to be translated based on the acquired source-object information, or that the recognition result is not accurate.

Accordingly, to ensure the integrity of the input information of an object and the accuracy of the recognition result, in the first embodiment of the present disclosure, after the image feature and/or the text feature is/are extracted based on the acquired source-object information, if a source object to be translated is not recognized based on the extracted image feature and/or text feature, other information such as text information and/or image information related to the source object to be translated can be obtained based on the extracted image feature and/or text feature. Subsequently, a source object to be translated can be accurately recognized according to a preset object recognition model, the extracted image feature and/or text feature, and the acquired text information and/or picture information.

The text information and/or the picture information related to the source object to be translated can be acquired by at least one of performing a network search based on the extracted image feature and/or text feature, performing matching lookup on pictures and/or texts locally stored in advance, based on the extracted image feature and/or text feature, and acquiring related information of a source object input by a user, such as text and/or picture information.

For example, the terminal apparatus collects picture information, text information or audio information, converts audio into texts, and performs object recognition. If the source object cannot be recognize according to the source-object information collected by the terminal apparatus, a network search engine is enabled to look up and match pictures and text. Therefore, more pictures and text related to the object are obtained. Then, the obtained picture information and text information are recognized, after being filtered and normalized. If the source object still cannot be recognized, more picture information or text information is input. The process is repeated until either the source object is recognized or the number of repetitions exceeds a threshold. Although dishes (i.e., meals) are generally not packaged, and in extreme cases, only dish names are listed on a menu, source dishes can be matched and recognized by the above translation solution for handling incomplete input object information.

Returning to the method of FIG. 1, in step S102, a corresponding target-object information is obtained by translation for the recognized source object.

Specifically, language environments respectively corresponding to a source object and a target object can be determined. Then, target-object information corresponding to the source object can be obtained by translation based on the language environments respectively corresponding to the source object and the target object.

A language environment corresponding to the source object is different from a language environment corresponding to the target object.

In actual applications, the language environment can be expressed as language type. For example, when there is text content in a source object and a target object, the language type of text content is different. Alternatively, when there is no text in the source object and the target object, such as when only patterns are included in the source object and the target object, the language types of the environments of the source object and the target object are different, such as road signs in different countries.

In actual applications, after a source object is recognized, a translation orientation can be determined according to the source language of the source object and the translated target language. The source language of the source object is a language environment corresponding to the source object, while the target language is a language environment corresponding to the target object.

In the first embodiment of the present disclosure, the language environment corresponding to the source object can be determined according to at least one of a location detected by a location detection module, a language environment recognized from the acquired source-object information, a source object searched from a preset object knowledge graph database, and a user setting. For example, the country and the language of the source object are automatically detected by a global positioning system (GPS) module.

The language environment corresponding to the target object can be determined by at least one of a location detected by a location detection module, a pre-designated language environment, a user setting, and personal information of a user.

For example, it is possible to pre-designate the language environment of a system as the language environment corresponding to the target object. Alternatively, when a user's behavior of setting a target language in a terminal apparatus is detected, the target language set by the user is used as the language environment corresponding to a target object. If no user's behavior of setting a target language is detected, the language environment of the apparatus system is set as the language environment corresponding to a target object by default.

In the first embodiment of the present disclosure, after the language environments respectively corresponding to the source object and the target object are determined, a corresponding object alignment model can be selected based on the language environments respectively corresponding to the source object and the target object.

Based on the selected object alignment model, the target-object information corresponding to the recognized source object is obtained by translation. Specifically, based on the source-object information, a text feature and/or an image feature corresponding to the source object can be obtained, and based on the acquired text feature and/or image feature and the selected object alignment model, the target-object information corresponding to the recognized source object is obtained by translation.

The object alignment model is established in advance by determining a text feature and/or an image feature between a sampled source object and a corresponding sampled target object, and obtaining, according to the determined text feature and/or image feature, an object alignment model by training.

In actual applications, multi-modal data of a plurality of sampled source objects and of the sampled target objects corresponding to the sampled source objects in different translation orientations can be acquired in advance, an image feature and/or a text feature is/are extracted from the multi-modal data, the text feature and/or the image feature between the sampled source object and the sampled target object is/are determined based on the extracted image feature and/or text feature, and an object alignment model is obtained by learning and training according to the text feature and/or the image feature between the sampled source object and the sampled target object. The multi-modal data includes at least one of text, pictures, audio, and video, which are related to an object.

To improve the quality of object translation, in the first embodiment of the present disclosure, the object alignment model can be optimized. Specifically, after the target-object information is obtained by translating the object information, the object alignment model can be optimized according to at least one of feedback information from a user for the target-object information obtained by translation, the language environment corresponding to the source object, and the language environment corresponding to the target object.

For example, user's behavior data for the target-object information can be collected and used as feedback information for updating and optimizing the object alignment model. Specifically, the location information of a source object can be detected by a terminal apparatus, and whether the location information is a source of the source object is automatically determined by location characteristics. If the location information is a source of the source object, the location information is added into the location information in the knowledge graph of the source object. By collecting a series of user's log data (e.g., a user's clicking rate and a "thumbs-up" rate for a list of translation candidates), an alignment model parameter is updated. If a certain target object has a high clicking rate or a high "thumbs-up" rate, an alignment probability thereof is increased, and the alignment probability thereof is decreased if the target object has a low clicking rate or "thumbs-up" rate.

In the first embodiment of the present disclosure, when there is a plurality of source objects to be translated, after the source objects to be translated are recognized, a type of each source object can also be detected. If the source objects to be translated are a combined object of an identical type, all the source objects are translated as a source combined object. If the source objects to be translated do not belong to an identical type, each source object can be separately translated, and target-object information corresponding to each source object is obtained by translation.

Specifically, when there is a plurality of source objects that are a combined object of an identical type, the target-object information corresponding to the source objects is obtained by translation. This can be realized by at least one of obtaining, for a source combined object corresponding to a plurality of source objects, a corresponding target-combined-object information by translation, and respectively obtaining, for each source object, target-object information corresponding to each source object by translation.

In actual applications, there can be one or more target objects corresponding to a source object. Accordingly, when there is a plurality of source objects, related information of one or more target objects corresponding to the source object can be respectively obtained for each source object by translation.

In the first embodiment of the present disclosure, before the target-object information corresponding to a source object is obtained by translation based on the acquired source-object information, a user's translation intention can be predicted, and a processing model for offline translation can be stored in advance according to the user's translation intention.

The target-object information corresponding to a source object can be obtained by translation, by the stored processing model, by obtaining, based on the acquired source-object information, the target-object information corresponding to the source object by translation.

A user's translation intention can be obtained by predicting according to at least one of a user's schedule, personal information of a user, such as interests and hobbies, information about an environment of an apparatus, and apparatus motion state.

The translation intention obtained by prediction can include an action track and/or a source object to be translated.

In actual applications, the processing model for offline translation can include at least an object recognition model for offline translation, an object knowledge graph database, and an object alignment model. According to an object type and an action track related to a source object to be translated in the translation intention obtained by prediction, an object knowledge graph database for offline use can be set, without downloading object knowledge data of other object types of a relatively weak correlation. Thus, the size of the database is reduced.

For example, first, models and databases set in advance in a system can be compressed and filtered, and the databases are classified according to the type of objects. The terminal predicts a user's translation intention in advance, and downloads related models and databases filtered, compressed and classified in advance, without consuming the mobile network data traffic of a user.

When the terminal apparatus detects that the mobile network data traffic is in use, the terminal apparatus gives priority to looking up and translating processes according to models and databases downloaded to the terminal apparatus, thereby reducing communication between the apparatus and a cloud service. Since the size of the database is greatly reduced, search space during the translation is reduced, thereby avoiding a large amount of computation, which conserves electric power. An object information translation solution for limiting traffic and conserving electric power will be described in reference to the seventh embodiment of the present disclosure.

Returning to FIG. 1, in step S103, the target-object information is output in a multi-modal manner, such as by at least one of texts, images, audio and video. The target-object information output manner can be self-adaptively adjusted based on at least one of a user's operation, environment of a terminal, network condition, terminal type, and electric power condition.

The target-object information includes, but is not limited to, at least one of picture, name, location, price, type, and related audio/video information of the target object.

In actual applications, when the source-object information is acquired by a terminal apparatus, the target-object information obtained by translation can be displayed and output by displaying the source-object information and the target-object information in spilt screens, or displaying, by an AR display technology, the target-object information in a capture area of the source-object information.

In the first embodiment of the present disclosure, the target-object information obtained by translation can be self-adaptively adjusted and output based on at least one of apparatus type of an apparatus, storage state of an apparatus, current network condition, electric power state of an apparatus, and personal information of a user.

The target-object information can also be obtained by acquiring source-object information to be sent to a receiver, and obtaining, based on a language environment of the receiver and the acquired source-object information, the target-object information corresponding to the source object by translation. Then, the target-object information obtained by translation can be sent to the receiver.

Accordingly, the translation method provided by the present disclosure can be applicable to social networks in which self-adaptive translation of object information is performed. During the translation, personal information of a social network user can be collected, such as region or nationality of the user, for determining a language environment corresponding to a source object and a language environment corresponding to a target object. That is, the translation orientation of the object information is determined, and corresponding translation results are provided for each translation orientation. The translation orientation is determined by the language environment corresponding to the source object and the language environment corresponding to the target object. During a social interaction course, for an identical source object, language environments of different target objects can be determined according to differences in countries and nationalities of receivers who view the translation results.

The fifth embodiment of the present disclosure will describe the solution for translating object information in social networks.

In actual applications, when there is a plurality of target objects, each target-object information can be ranked and then output. Specifically, each target-object information can be ranked according to at least one of correlation with a source object, user's behavior with respect to the target-object information, attribute information of the target object, and personal information of a user.

The personal information of a user includes information such as a user's preference, and can also include information such as the current location of a user (i.e., the current location of a user can be acquired by the location of the apparatus). The attribute information of a target object can include price, and a user's purchase probability can be comprehensively determined according to the personal information of a user and attribute information of a target object.

For example, when there is a plurality of target objects, the plurality of target objects are arranged based on at least correlation with a source object, a clicking frequency of a user, and difficulty in purchasing. Thus, the target objects are arranged by priority. The clicking frequency of a user can be acquired by collecting a user's log for operating target objects, extracting the number of clicks of the related objects from log data, and thereby calculating a frequency of clicking each target object. The method for acquiring the difficulty in purchasing is at least one of comprehensively considering a distance between a current terminal location and a purchasing location, or the purchasing price.

To present the translation result to a user more explicitly and cause an immediate feedback and a quick response to a user's requirements in the first embodiment of the present disclosure, if the multimedia information is collected by a multimedia collection apparatus in real time and is used as the source-object information, when there is a plurality of source objects, a user's operation of selecting the target-object information obtained by translation can also be detected, and the source object corresponding to the target-object information selected by the user is positioned in the multimedia information collected in real time. Alternatively, a user's operation of selecting a source object can also be detected. If an operation of selecting a certain source object is detected, the target-object information corresponding to the source object selected by the user can be positioned in a preset outputting manner.

To improve the translation quality, a translation result with a crowdsourcing translation feedback weight can also be acquired based on the acquired source-object information, and the target-object information corresponding to the source object is adjusted according to the translation result with a crowdsourcing translation feedback weight.

The translation result with a crowdsourcing translation feedback weight can be acquired by sending, to a plurality of preset answering users, a crowdsourcing translation request for the source-object information, collecting translation results, fed back by each answering user, for the crowdsourcing translation request, and determining a crowdsourcing translation feedback weight of each translation result, according to the type of the answering user and the occurrence frequency of translation results.

In the first embodiment of the present disclosure, after the target-object information is obtained, the output of the target-object information is adjusted based on a user's operation with respect to the source-object information.

For example, when the user's operation is activating a browse mode of a target object, the target-object information can be output by collecting multimedia information in real time by a multimedia collection apparatus, and positioning the target object corresponding to a source object in the multimedia information collected in real time. Texts and/or images of a plurality of objects are captured in real time. If there is an object matched with the target object in the captured texts and/or images, the object is identified and displayed in a display mode corresponding to the browse mode.

When there is a plurality of source objects and a user's operation is activating a multi-object interaction mode of the target objects, the selected target object can be detected, and a source object corresponding to the selected target object can be identified and displayed.

Traditional machine translation technologies generally concern mere translation, but in actuality, a user needs to understand the translated content and acquire related knowledge. For example, when a name of a foreign drug is input, by the traditional machine translation, translation will be correspondingly performed according to what has been input without further understanding of whether the translated content corresponds to a certain named entity. If the translated content corresponds to a certain named entity, consideration is given to whether useful information related to the translated content, such as effects, dosage, suitable audiences and manner of purchasing, are to be provided. Such a passive translation, i.e., translating those input by a user as they are, cannot really meet a user's actual requirements.

In order for a user to better understand the translated content, the method for translating object information provided by the first embodiment of the present disclosure can also include derivative translation. Specifically, derivative information associated with a target object and/or derivative information associated with a source object can be acquired and output.

In the first embodiment of the present disclosure, the derivative information associated with a target object can be acquired by searching, from a preset object knowledge graph database, the attribute information corresponding to a preset attribute of a target object, and determining the searched attribute information as the derivative information associated with the target object.

Correspondingly, the derivative information associated with the source object can be acquired by searching, from a preset object knowledge graph database, attribute information corresponding to a preset attribute of a source object, and determining the searched attribute information as the derivative information associated with the source object.

The preset attribute is determined according to type of a target object and/or a source object.

For example, the derivative information about a target object can include key information related to a target object acquired according to an object type of a target object and by an object knowledge graph database established in advance.

The acquired derivative information can also include comparison information between the source object and the corresponding target object. That is, the derivative information about the source object and about the target object are displayed simultaneously. The comparison information is determined by the key information (e.g., attribute information of a preset attribute) respectively related to the source object and the corresponding target object. Key information related to the target object and related to the source object can be acquired by an object knowledge graph database established in advance.

Thus, in the first embodiment of the present disclosure, the derivative information associated with the target object can also be determined based on the location information corresponding to the target object, and the derivative information associated with the source object is determined based on the location information corresponding to the source object.

In the first embodiment of the present disclosure, if the derivative information associated with the target object and the derivative information associated with the source object are acquired, derivative information to be prominently displayed can be positioned according to correlation between the two pieces of derivative information, the acquired derivative information is output, and the positioned derivative information is prominently displayed.

When there is a plurality of source objects belonging to a combined object of an identical type, acquiring derivative information associated with the target-object information by translation includes at least one of acquiring, for a source-combined-object corresponding to a plurality of source objects, derivative information associated with corresponding target-combined-object information, and respectively acquiring, for each source object, the derivative information associated with the corresponding target-object information.

To improve the output result for a user's requirement on personalization, in the first embodiment of the present disclosure, after the derivative information is acquired, the acquired derivative information can be output by determining, according to the personal information of a user, the language environment corresponding to the acquired derivative information, and displaying, based on the determined language environment, the acquired derivative information.

In the first embodiment of the present disclosure, the derivative information to be prominently displayed can be positioned according the personal information of a user, and the positioned derivative information is prominently displayed.

For example, the derivative information of the target object can be ranked according to relevancy between the personal information of a user and the derivative information of the target object, and the derivative information to be prominently displayed is positioned according to the ranking.

A related reminder event can be generated or altered according to the personal information of a user and/or the acquired derivative information. Specifically, it is determined whether there is a reminder event related to the target object in a terminal apparatus. If there is no reminder event related to the target object, a reminder event can be generated according to the personal information of a user and/or the acquired derivative information. If there is a reminder event related to the target object, the reminder event can be altered according to the personal information of a user and/or the derivative information.

The personal information of a user can include at least one of a user's average bedtime schedule, health state, and range of motion. The derivative information of the target object includes at least one of time interval, starting and ending time, and repetition time. The user's average daily schedule can be determined by at least one of time for turning on and turning off a terminal apparatus, and a user's daily activity time. The user's health state can be determined by at least one of data recorded in health applications, blood pressure and an impulse sensor. The user's range of motion can be determined by at least one of motion track recorded by a GPS, and motion speed recorded by a gyroscope.

In actual applications, whether there is a reminder event related to the target object in a terminal apparatus can be detected by judging, according to content relevancy between a set reminder event in the terminal apparatus and the target object, whether there is a reminder event related to the target object. This will be described in detail in reference to the fifth embodiment of the present disclosure.

Due to differences in aspects such as language, culture and cognition of different users, geographic location of an identical user when using machine translation in a mobile apparatus or a wearable apparatus constantly changes. In the method for translating object information provided by the present disclosure, location information of the occurrence of translation and the personal information of a user are considered during the translation, so that the translation result and the derivative translation are better tailored to a user's actual requirements.

The object-to-object translation method provided by the present disclosure can be applied to a terminal apparatus. The "terminal" and the "terminal apparatus" used here can be portable, transportable, and installed in a transportation vehicle (aerial, marine and/or land transportation vehicles), can be suitable for and/or configured to operate locally, and/or can be operated on Earth and/or in Outer Space. The "terminal" and "terminal apparatus" used here can also be a communication terminal, such as a personal digital assistant (PDA), a mobile Internet device (MID) and/or a smart phone, and can also be wearable, such as a smart watch and smart glasses.

A concept of derivative translation is disclosed in the present disclosure. A translation result is provided, and the translated content is analyzed to provide derivative information. Accordingly, the translated content is supplemented, and a user's understanding of the translated content is enhanced.

Second Embodiment

In the second embodiment of the present disclosure, the method for translating object information provided by the first embodiment of the present disclosure will be described from the perspective of a single object to be translated (i.e., a single object) and from the perspective of a plurality of source objects to be translated (i.e., multiple objects). For the ease of description, "translation of object information" can be referred to as "object translation" herein.

Description will be given below, of an example in which a Chinese user uses the solution for translating object information provided by the present disclosure in a mobile terminal apparatus to translate unfamiliar foreign commodities. The terminal has a shooting function and a touch screen. Related information of object translation is displayed on the mobile terminal. In this embodiment, both input information and output results are displayed on one screen.

Figure 2:
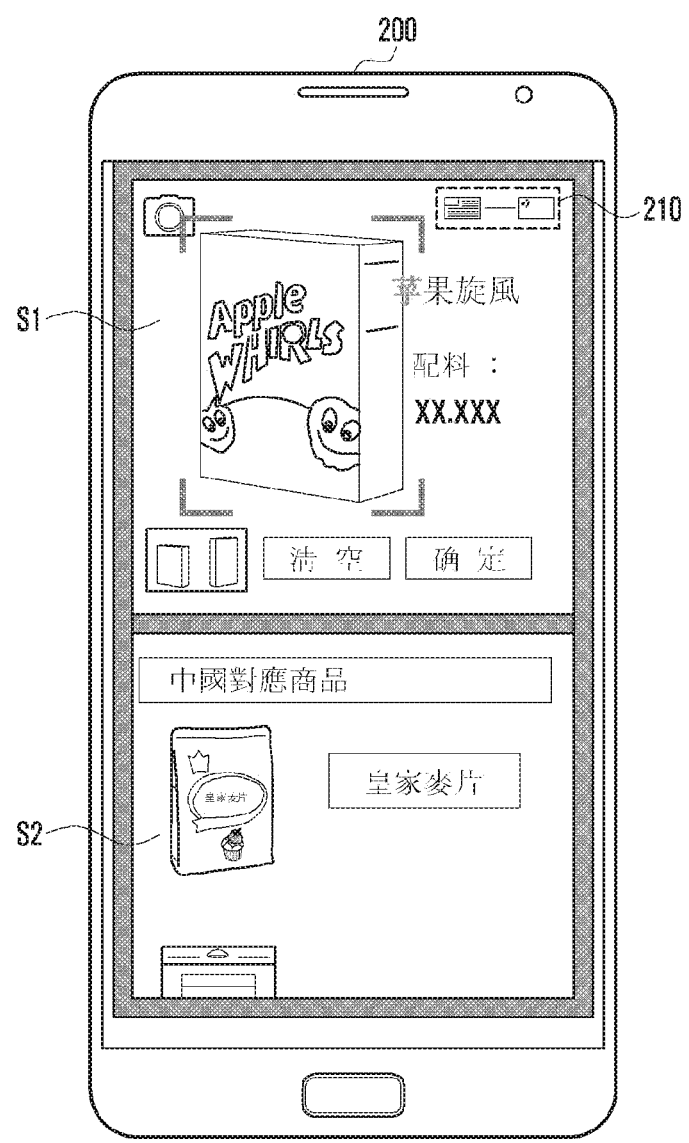
FIG. 2 illustrates inputting a single object according to a second embodiment of the present disclosure.

FIG. 2 illustrates inputting a single object according to a second embodiment of the present disclosure. In FIG. 2, an interface of a terminal apparatus 200 is divided into top and bottom sections, the top section being a capture area of a source object, and the bottom section being a display area of a target object. The capture area of a source object provides an entrance for object translation and displays the translation of texts in an image, while the display area of a target object mainly provides a system output for object translation, and can also collect a user's behavior log with respect to the translation results as feedback.

I. Translation of a Single Object

The course of translating a single object provided by the second embodiment of the present disclosure can be divided into steps S1 and S2, as follows:

In step S1, a terminal apparatus 200 acquires the source-object information.

When the terminal apparatus detects that a user enables the object translation function of the present disclosure, the terminal apparatus 200 enables the apparatus camera automatically or based on a user's operation to acquire information such as an image captured by a current viewfinder. A thumbnail of the image can also be displayed, and information such as an image of the source object is determined based on the detection of users' confirm operation.

Alternatively, information such as images and texts captured by the current viewfinder is transferred to a server, and is processed by the terminal apparatus 200 such as by filtration and/or character recognition. Information such as images and texts of the source object is determined based on the detected confirm operation of the user.

For example, when the terminal apparatus 200 detects that a user enables the object translation function, the terminal apparatus 200 automatically enables the camera. A viewfinder appears in the center of the capture area of a source object. If the apparatus detects that a user clicks the "Confirm" button, the image captured by the current viewfinder is transferred to a server, and a thumbnail of the image is displayed. The display position can be a side edge or a bottom edge of the captured source image area. If the apparatus detects that a user clicks the "Empty" button, all the current thumbnails and images corresponding thereto uploaded to the server are cleared. If the apparatus detects that a user clicks the "Confirm" button for many times, images are uploaded to the server in order of upload, and the thumbnails thereof are arranged accordingly.

The captured images can be viewed or deleted by thumbnails. When the apparatus detects a user's operation of selecting a certain thumbnail, an image corresponding to the thumbnail is uploaded to the terminal from the server and displayed in the viewfinder. The camera is turned off temporarily at this time. If the apparatus detects that a user long presses an image, an option of deleting the image is provided. If the apparatus detects that a user selects "Delete", the delete operation is activated. The thumbnail is deleted from the terminal, and a corresponding image is deleted from the server.

When a camera is turned off temporarily, the terminal can still enable operation of the camera, such as by placing a return button in an appropriate area of the screen, by quickly clicking a certain area of the screen several times, or providing other interrupt mechanisms.

In step S2, the translated target-object information is displayed, and the translation result is displayed in the terminal. The translation result includes, but is not limited to, at least one of a picture, a name, location information, price information, type information, and related audio/video of the target object. There can be one or more target objects, and text translation in the capture area of the source object can also be included.

The displaying includes outputting related content of the target object listed above in a display area of the target object. A plurality of target object candidates can be included, and arranged based on correlation with the source object, a user's clicking frequency, or difficulty in purchasing for example. As a result, the target object candidates can be arranged by priority. The clicking frequency of the user can be acquired by collecting a user's log for operating a target object, extracting the number of clicks on the related objects from the log data, and thereby calculating a clicking frequency of each target object. The method for acquiring difficulty in purchasing can be comprehensively considering either a distance between a current terminal location and a purchasing location, or the purchasing price.

IF the apparatus is currently in a thumbnail viewing state in the capture area of the source object, i.e., a camera-disabled state, text translation acquired by the following steps based on analysis, object recognition and translation is displayed in an image in the viewfinder. If the apparatus is currently in a camera-enabled state, the translation acquired by following steps based on analysis, object recognition and translation is directly displayed in the viewfinder by AR (AR).

The translation result can be based on analysis, object recognition and translation by performing recognition on objects in an image by extracting an image feature and recognizing characters, translating texts in the image from the source language into the target language, and translating the source object in the image into the target object.

In step S1, the terminal apparatus acquires pictures of an object, or transfers the pictures of the object to a translation system in the server, and performs recognition on the object first. With reference to features required by an object recognition model, an image feature is extracted from an image, and optical character recognition (OCR) is performed, a text feature is extracted, and the object recognition is performed according to the object recognition model to obtain a source object to be translated and text in the image. The source objects are translated, by an object alignment model, into target object candidates according to scores, and the source texts in the image are translated into a target language by a text translation model and a language model.

The source language is determined by automatically detecting, by a GPS module of the terminal apparatus, country and language of the source object or the language type of texts in the image, determining the source language after the source object is recognized, by searching a source of the source object from the object knowledge graph database, or setting the source language type by a user.

The language type of the target object is determined by automatically detecting, by a GPS module of a terminal apparatus, the country and language of the source object, obtaining the target language type based on the personal information of a user, such as judging the language used by a user according to the nationality of the user using the terminal apparatus, or determining the language type according to the language type set by the user. For example, when a user's behavior of setting a target language on a terminal apparatus is detected, the target language set by the user is used as the language type of the target object, and if no user's behavior of setting a target language is detected, a default apparatus system language type is set as the language type of the target object. As shown in FIG. 2, the language types of the source object and the terminal object 210 are displayed in the top right part of a display screen, and whether a user sets a language type is detected. If the terminal does not detect a setting of the user, as described in the method above, the source language is displayed on the left, and the target language is displayed on the right. If the terminal detects that a user sets the target language as Chinese, the language type of the target object should be correspondingly configured as Chinese.

In the second embodiment of the present disclosure, the object recognition model, the object alignment model and the object knowledge graph database are established by collecting a large amount of multi-modal data of the source object and the target object, including pictures and texts, extracting a text feature and an image feature, establishing an object type discrimination model and an object recognition model in each type by supervised learning, calculating a score of text description similarity between the source object and the target object according to an existing translation model (object alignment model) between a source language and a target language, extracting text features and image features, and obtaining an object alignment model by training with supervised learning. Entities and relation attributes of related objects are extracted from the collected large-scale multi-modal data related to the objects, and are expressed by three categories <entity, entity, relation, and an object look-up index is established according to a preset object type, to form object knowledge graph data. The "relation" has a specific corresponding meaning for different objects. For example, for "the color of the object A is blue", <A, blue, color> can be established for the categories. In the present disclosure, the "relation" attribute of different objects will be described in detail in derivative translation. In derivative translation, "relation" can be expressed as "key information" of an object, i.e., the attribute information of a preset attribute. For example, the key information of drugs includes effects, side effects, dosage, contraindicated crowds, and manner of accessing, the key information of foods includes ingredients, allergens, energy, suitable consumers, and flavor, wherein the key information of packaged foods includes place of origin, production date, and shelf life, and the key information of unpackaged dishes (meals) and menus also includes flavor, scent, temperature, color, eating and cooking methods, and the key information of cosmetics includes ingredients, place of origin, effects, suitable crowds, shelf life, and usage.

II. Translation of Multiple Objects

In translating multiple objects provided by the second embodiment of the present disclosure, the terminal apparatus uploads images of source objects, or the camera of the terminal apparatus captures images of a plurality of source objects, and the terminal apparatus performs recognition on the plurality of source objects by object images and/or text in the object images. The recognition results are automatically classified. If the source objects belong to a combined object of an identical type among pre-defined object types, all the source objects can first be regarded as a combined object for translation, and then each individual object is translated. If the source objects do not belong to an identical type among the pre-defined types, each object is directly translated, and target objects corresponding to the source objects are graded and ranked by translation and are displayed in the terminal. If the terminal apparatus captures a user's behavior of selecting a certain object in the viewfinder, the translation result is adjusted in real time to separately display the target object corresponding to the source object in the terminal, and the target objects are graded and ranked by translation.

Figure 3:
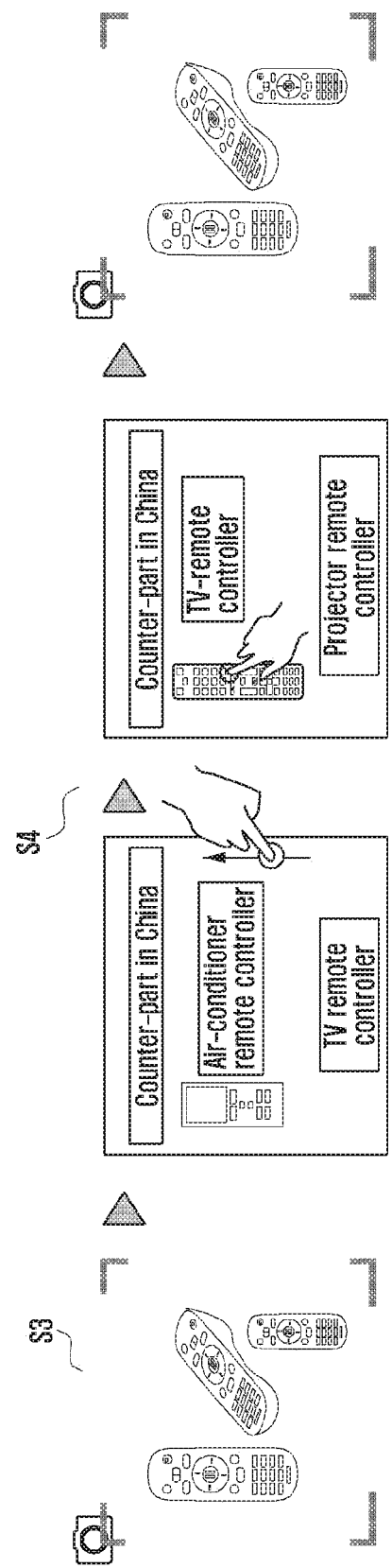
FIG. 3 illustrates inputting multiple objects according to the second embodiment of the present disclosure.

FIG. 3 illustrates inputting multiple objects according to the second embodiment of the present disclosure.

Specifically, the course of translating multiple objects provided by the second embodiment of the present disclosure can be divided into steps S3 and S4, as follows:

In step S3, the source-object information is obtained, as a camera of the terminal apparatus 200 captures the images of a plurality of source objects. The terminal is operated in the identical manner as in step S1 in the second embodiment. As shown in FIG. 3, the terminal apparatus captures the images of a plurality of remote controllers.

In step S4, the translated target-object information is displayed.

If it is determined that a source object belongs to a plurality of identical objects, it is indicated that a plurality of identical objects are input, and thus only this single object is translated. This single object is output as in step S103 in the first embodiment or displayed as in step S2 of the second embodiment of the present disclosure.

If it is determined that a source object belongs to a combined object of an identical type, that is, among the object types defined in advance, the source objects are regarded as a combined object for translation, and then each individual object is translated. When the translation results are displayed, the translation result of the combined object is displayed first, and the translation result of each object is separately displayed.

If it is determined that the source objects have no obvious combination relation, each object is directly translated, and then the translation results of each object are displayed.

If belonging to the latter two situations, i.e., the source object belongs to a combined object of an identical type or the source object have no obvious combination relation, the third embodiment of the present disclosure provides an interactive manner of multi-object inputting. When the terminal apparatus captures a user's operation of selecting a certain source object in a viewfinder, the translation result is adjusted in real time in the terminal. The adjustment includes, but is not limited to separately displaying the target objects, corresponding to this source object, graded and ranked by translation, or identifying the target object sequence of this source object by arranging the sequence top to bottom by highlighting or border selecting, for example.

If belonging to the latter two situations, the third embodiment of the present disclosure also provides an interactive manner of multi-object inputting by means of an AR display technology. Objects that a user wishes to find can be directly displayed in the capture area of the source object.

In the second embodiment of the present disclosure, it is judged whether a plurality of source objects belong an identical type by looking up the name of each object in the object knowledge graph database, and 1) if their names are identical, inputting the names as a single object, 2) if their names are of an identical brand or type prefix, processing the names as the identical type, for example, "Friso infant formula 1" and "Friso infant formula 2", or 3) analyzing and recognizing the picture feature and the text feature of the input objects, and looking up the corresponding locations of the objects from a knowledge graph. If the corresponding objects belong to a sub-node under an identical brand, such as facial cream and emulsion under a certain brand, processing the objects as a combined object of an identical type.

Otherwise, objects will be processed as different types.

In the second embodiment of the present disclosure, by an object alignment model established in advance, unfamiliar foreign objects such as drugs, foods, cosmetics, and road signs are translated into corresponding domestic objects with which a user is familiar, or domestic objects are translated into corresponding objects of the target country by exchanging a translation orientation. Therefore, the range of machine translation subjects is expanded.

Third Embodiment

To enhance the translation results, the third embodiment of the present disclosure interactively translates object information by means of AR.

It is to be noted that the AR interactive translation method introduced here is not only applicable to object-to-object machine translation, but also helps improve other conventional translation methods, such as a method in which direct translation is performed based on characters recognized from image information of a source object.

The method for interactively translating the object information by means of AR is divided into the following three steps:

In step 1, the source-object information is acquired.

In step 2, the translated target-object information is displayed.

In step 3, a corresponding response is made, by a terminal, according to the detected operation of a user.

In the third embodiment of the present disclosure, steps 1 and 2 can be implemented with reference to steps S1 and S2 of the second embodiment, and will not be repeated here for conciseness.

When the source-object information includes multimedia information corresponding to the source object, the source-object information can be acquired by collecting multimedia information in real time by a multimedia collection apparatus, and using the multimedia information collected in real time as the source-object information.

The detected operation of a user in step 3 includes, but is not limited to clicking, long pressing, or border selecting information (for example, recognized characters) of a related image in a source capture area, clicking, long pressing, or border selecting a certain target object in a target display area, or clicking a button for enabling the interactive mode. Responses corresponding to a user's operation include, but are not limited to, performing adaptive adjustment based on the detected source-object information, such as recognizing related source objects or highlighting characters recognized from related images, adjusting the display of a source object based on an operation performed with respect to a target object, or adjusting the display of a target object based on an operation performed with respect to a source object, such as displaying by AR technology.

Step 3 can be performed by at least one of directly translating the source object, positioning the target object, and positioning the source object.

When directly translating the source object, the displaying of a source object and/or a target object is adjusted according to the detected operation performed with respect to a capture area of the source object. Specifically, the terminal detects the operation performed with respect to the source capture area. If it is detected that a user performs operations, such as clicking, widening, long pressing, on a certain area of an object, characters recognition results and texts translation results of the area are prominently displayed inside the source viewfinder, by enlarging the area, or highlighting and/or border selecting the range of the area. As shown in FIG. 2, when the terminal detects that a user performs operations such as clicking, long pressing, or widening on the "ingredient" area in the source viewfinder, the "ingredient" area presented in the source viewfinder will be enlarged and all the text translations in the area will be displayed.

When positioning the target object, the displaying of the source object and/or the target object is adjusted according to the detected operation of a user with respect to the display area of a target object. Specifically, the terminal detects a display area of the target object. If it is detected that a user activates an interactive display mode of a certain target object, the AR interactive display mode of the target object is enabled.

Figure 4:
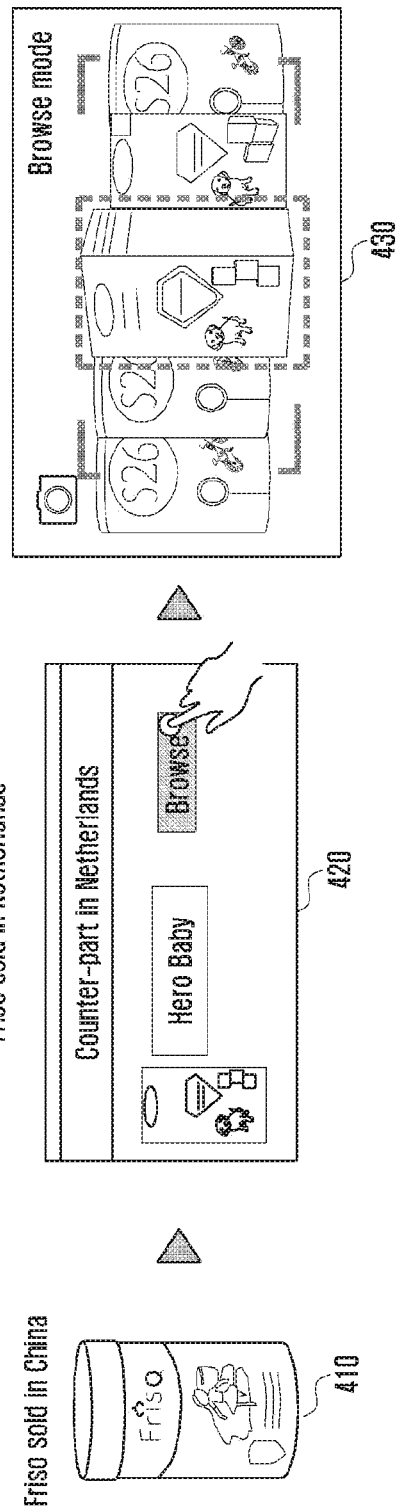
FIG. 4 illustrates AR interactive object translation of a single object according to a third embodiment of the present disclosure.

FIG. 4 illustrates AR interactive object translation of a single object according to a third embodiment of the present disclosure. In FIG. 4, a Chinese user is at a mall in the Netherlands and wants to purchase a certain milk powder sold in Netherlands, but the user only has a photograph 410 of the milk powder sold in China. With the method for interactively translating object information by means of AR, the user can easily and quickly find the formula produced locally in the Netherlands.

Specifically, by processing as described in step 1 and step 2, that is, the terminal apparatus detects that a user uploads an image of the source object (i.e., the milk powder), and analyzes, recognizes and translates the image on the server. Thus, the images and related text descriptions of an object (i.e., the target object) corresponding to the milk powder in Netherlands are obtained.

In step 3, the present disclosure provides, in the display area of the translation results, a user with an option "browse mode" 430, by providing a browse button 420 beside a corresponding object picture on a screen, or associatively long pressing, or double-clicking an object picture to activate the browse mode, or activating the browse mode by a certain preset voice instruction.

When detecting that a user activates the "browse mode", the terminal apparatus enables the camera of the terminal apparatus and adjusts a ratio of the viewfinder to the screen to an appropriate ratio. The terminal uploads images captured by the camera in real time. The server performs multi-target recognition on images, and matches the recognized objects with a target object. If a certain object in an image can be matched with the target object, the server highlights, border selects or alternatively identifies the object in the viewfinder by AR.

In the third embodiment of the present disclosure, a plurality of objects in an image uploaded by the terminal in real time can be referred to as object candidates, and the translated target objects can be object references. The matching referred to above includes extracting an image feature and/or a text feature of the target object from an object knowledge graph database, extracting image features of the object candidates from an object knowledge graph database, and performing characters recognition on the images of the object candidates to extract the text features, and then measuring similarity between the image features and/or the text features between the object candidates and the target object. The method for calculating similarity can be a cosine similarity method, a kernel method, or a calculation method based on distributed representation.

When positioning the source object, and there is a plurality of input source objects, a user's operation of selecting the target-object information obtained by translation can be detected, and a source object corresponding to the target-object information selected by a user is positioned in the multimedia information collected in real time.

Specifically, displaying in the capture area of the source object can be adjusted, according to a user's operation with respect to the display area of a target object detected by the terminal. For example, the object that a user wants to find is directly displayed in the capture area of the source object, which will now be described by referring back to FIG. 3.

The terminal apparatus captures, by a camera, the images of a plurality of source objects. After the plurality of objects are recognized, determined by type, and translated according to the solution for translating multiple objects provided by the second embodiment, translation results are displayed in the display area of the target object. The terminal detects that a user activates the multi-object interaction mode, such as by a gesture operation including long pressing or double-clicking an image of a certain target object, or inputting a name of a certain target object by voice. If the terminal activates the multi-object interaction mode and detects a certain selected target object, the terminal highlights, border selects and/or identifies in other manners, in the viewfinder of the capture area of the source object, the source object corresponding to the selected target object.

Specifically, as illustrated in FIG. 3, if the terminal detects that a user activates the multi-object interaction mode and detects a certain selected target object, the terminal identifies, inside the viewfinder of the capture area of the source object, the source object corresponding to the selected target object by highlighting or border selecting.

For example, it is determined that a language type of these source remote controllers is Korean, and these source remote controllers belong to different types such as TV, air-conditioner, and microwave oven remote controllers. Thus, each object is respectively translated into objects of a target language. It is determined whether the objects belong to an identical type by the method described above in the second embodiment Fourth Embodiment A user may need to understand the translated content and acquire related information on the content. For example, when a name of a foreign drug is input, by the traditional machine translation, translation will be correspondingly performed according to what has been input without further understanding of whether the translated content corresponds to a certain named entity. If the translated content corresponds to a certain named entity, consideration is given to whether useful information related to the translated content, such as effects, dosage, suitable consumers and manner of purchasing, is to be provided.

In order for a user to better understand the translated content, the fourth embodiment of the present disclosure discloses object information translation providing derivative information. Specifically, the derivative information associated with the target object and/or the source object can be acquired, and the acquired derivative information is output.

In actual applications, the attribute information corresponding to the preset attribute of the target object can be searched from a preset object knowledge graph database, and the searched attribute information is determined as the derivative information associated with the target object. The attribute information corresponding to the preset attribute of the source object can be searched from the preset object knowledge graph database, and the searched attribute information is determined as the derivative information associated with the source object, according to the type of the target object and/or the source object.

In the fourth embodiment of the present disclosure, the preset attribute of an object can be referred to as a "relation" attribute, and the attribute information corresponding to the preset attribute is expressed as "key information" of an object. For example, the key information of drugs includes effects, side effects, dosage, contraindicated audiences, and manner of accessing. The key information of food includes ingredients, allergens, energy, suitable consumers, and flavor, wherein the key information of packaged foods includes place of origin, production date, and shelf life, key information of unpackaged dishes (meals) and menus also includes flavor, scent, temperature, color, eating methods, and cooking methods, and the key information of cosmetics includes ingredients, place of origin, effects, suitable consumers, shelf life, and usage.

In the fourth embodiment of the present disclosure, the object information translation solution providing derivative translation will be described by translating the key information related to an object and using comparison information between the source object and the target object as the derivative information.

The key information and comparison information of a single object and multiple objects will now be described.

I. The Derivative Translation of the Single Object

Figure 5:
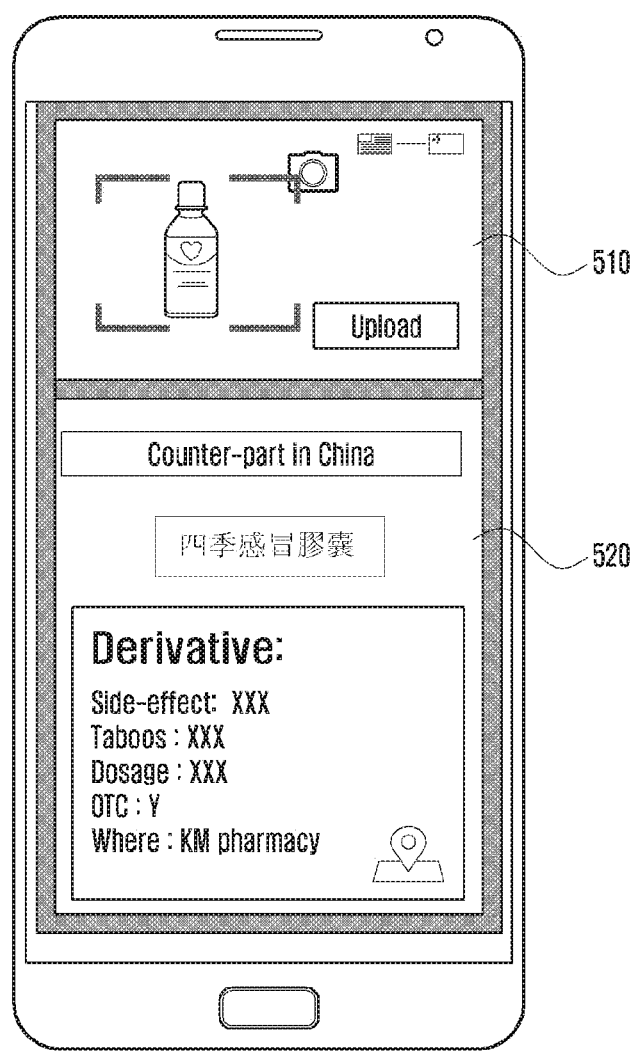
FIG. 5 illustrates derivative translation of a single object according to a fourth embodiment of the present disclosure.

FIG. 5 illustrates derivative translation of a single object according to a fourth embodiment of the present disclosure, as follows.

In step 1, related to 510 of FIG. 5, the source-object information is acquired.

Step 1 relates to the step of acquiring the source-object information in the second embodiment. The terminal captures pictures of a source object by a camera, or transfers existing pictures of a source object (for example pictures acquired from the Internet) to a translation system of this terminal or of a server.

For example, as shown in 510, an "upload" button is provided at a lower right corner in the capture area of the source object. An American user traveling in China wants to purchase a cold remedy, and the terminal detects that the user inputs a picture of a cold remedy transported by the American user and sets the target language as Chinese. The terminal transfers the picture of the source cold remedy to a server and informs the server that the target language is Chinese, thereby translating an American cold remedy into a Chinese cold remedy.

In step 2, illustrated in 520 of FIG. 5, the translated target-object information is displayed.

That is, after the target-object information corresponding to a source object is obtained by translation, the derivative information associated with the target object and/the source object can be acquired, and the acquired derivative information is output.

The derivative information of the target object can be displayed in a display area of the target object of the screen, by at least one of displaying the derivative information piece by piece in the form of a text list, presenting a certain piece of derivative information in the form of a picture, linking other applications of an apparatus in the form of a hyperlink, such as map navigation, and broadcasting derivative information in the form of audio/video.

Analyzing and recognizing an object and generating derivative information are performed as follows.

After an object is analyzed and recognized by the method of the second embodiment, the object is translated into a target object, and related key information is acquired from a knowledge graph of the target object.

The knowledge graph is established by extracting and marking the key information of each object, based on the object knowledge graph database established in the second embodiment. Specifically, the key information of an object is labeled as the derivative information according to the type of each object. The key information is related to an object type. For example, the key information of drugs includes effects, side effects, dosage, contraindicated consumers, and manner of accessing, the key information of foods includes ingredients, allergens, energy, suitable consumers, and flavor, wherein the key information of packaged foods includes place of origin, production date, and shelf life, and the key information of unpackaged dishes (meals) and menus also includes flavor, scent, temperature, color, eating methods, and cooking methods, and the key information of cosmetics includes ingredients, place of origin, effects, suitable consumers, shelf life, and usage.

The derivative information associated with the target object can also be determined based on the location information corresponding to the target object.

Derivative translation is generated according to the target language. After the derivative information of the target object is acquired, the translation system enables a text translation module. If the language of the derivative information is identical to that of the terminal apparatus system, the derivative information is output to the terminal apparatus, and if the language of the derivative information is different from that of the terminal apparatus system (or the target output language set by a user), the derivative information is translated into the language of the terminal apparatus system (or the target output language set by a user) and then output to the terminal apparatus. As illustrated in FIG. 5, since the derivative information of the Chinese cold remedy is in Chinese and inconsistent with the terminal system language of the American user, the language is required to be translated into the system language of the user.

II. Automatic Comparison Between the Source Object and the Target Object

Figure 6:
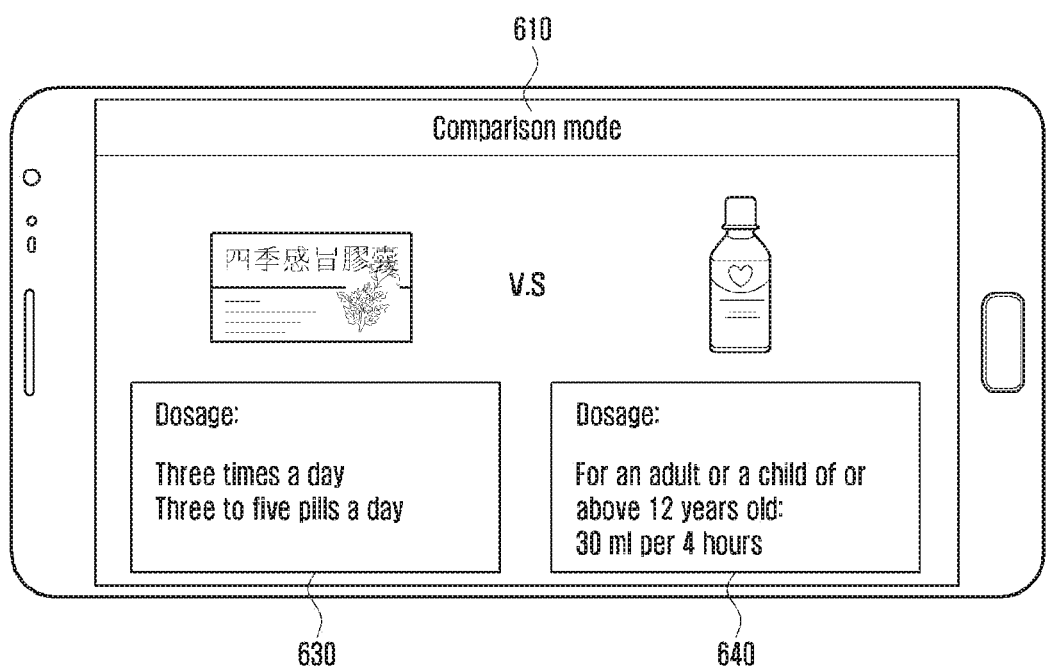
FIG. 6 illustrates automatic comparison between a source object and a target object according to the fourth embodiment of the present disclosure.

Specifically, FIG. 6 illustrates automatic comparison between a source object and a target object according to the fourth embodiment of the present disclosure.

To enable a user to better understand difference between the source object and the target object after the source object is translated into the target object, the method of FIG. 6 is provided.

In step 1, a comparison mode 610 is enabled.

Upon translating a source object into a target object by the translation system as described in steps S1 and S2 in the second embodiment and displaying the translation results on the terminal apparatus, a mechanism for activating the comparison mode 610 is provided to the terminal, by setting a compare button near the target object in the display area of the target object, performing a certain gesture operation, triggering a preset voice instruction, or automatic triggering the system.

If the terminal detects that a user activates the mode for comparing the source object and the target object, the terminal sends an instruction for comparing the current source object and the target object to the server.

In step 2, the comparison information is displayed in the terminal apparatus.

That is, the display is made in the terminal by a single screen, by left 630 and right 640 sections in a horizontal screen as shown in FIG. 6, or top and bottom sections in a vertical screen, and displaying in the terminal by two screens, with one screen displaying the key information of the source object and the other screen displaying the key information of all the target object candidates, in which case the target object candidates are switched by scrolling up and down, or sliding left and right. The key information of the source object and of the target object can also be presented by voice broadcasting, and difference information can be highlighted or border selected. For example, different dosages and usages of drugs on the left section 630 and the right section 640 are illustrated in FIG. 6 and can be highlighted.

To acquire the comparison information, the key information of the target object is obtained by step 2 of the derivative translation solution of a single object, and the method for acquiring key information of a source object is similar to the method for acquiring key information of a target object, i.e., includes looking up a source object from an object knowledge graph database, and extracting corresponding information of the source object in accordance with key information of a target object. For example, if the target object is a drug, the key information thereof includes effects, side effects, dosage, contraindicated consumers, and manner of accessing, and are looked up in the knowledge graph.

III. Derivative Translation of Multiple Objects

When it is detected that a plurality of objects is input, the process for generating and processing derivative information includes capturing, by the terminal apparatus, the images of the plurality of source objects, which is identical to step S3 of the second embodiment, and displaying derivative translation in the terminal.

This is described in the comparison mode of FIG. 6, when automatically comparing the source object and the target object.

The method for analyzing and recognizing a plurality of objects, generating derivative information of the plurality of objects, and translating the derivative information is as follows:

A server performs multi-target recognition on an image. The method for recognizing is as described in steps S2 and S4 in the second embodiment. After the recognition is performed, the translation system judges the recognized objects. If the recognized objects are identical, it is determined that a plurality of individual objects which are completely the identical are input, and the translation system only generates the derivative information of the target object corresponding to this individual object. If, among the object types defined in advance, the recognized objects belong to an identical type, all the source objects are regarded as a combined object and derivative information of the translated target object corresponding to the combined object is generated, and the derivative information of the target object corresponding to each individual object is respectively generated. If, among the object types defined in advance, the recognized objects do not belong to an identical type, the derivative information of the target object corresponding to each object is directly generated.

The name of each object is looked up from the object knowledge graph database. If their names are completely the identical, the names are input as single object. If the names are of an identical brand or prefix type, the names are processed as the identical type, such as the two source objects in 710 of FIG. 7, which illustrates derivative translation of multiple objects according to the fourth embodiment of the present disclosure. Then, the picture feature and text feature of the input objects are analyzed, and respectively recognized, and corresponding locations of the objects are looked up from a knowledge graph. If the names all belong to a sub-node under an identical brand, for example, facial cream and emulsion under a certain brand, the names are processed as a combined object of an identical type. Otherwise, objects will be processed as different types.

Figure 7:
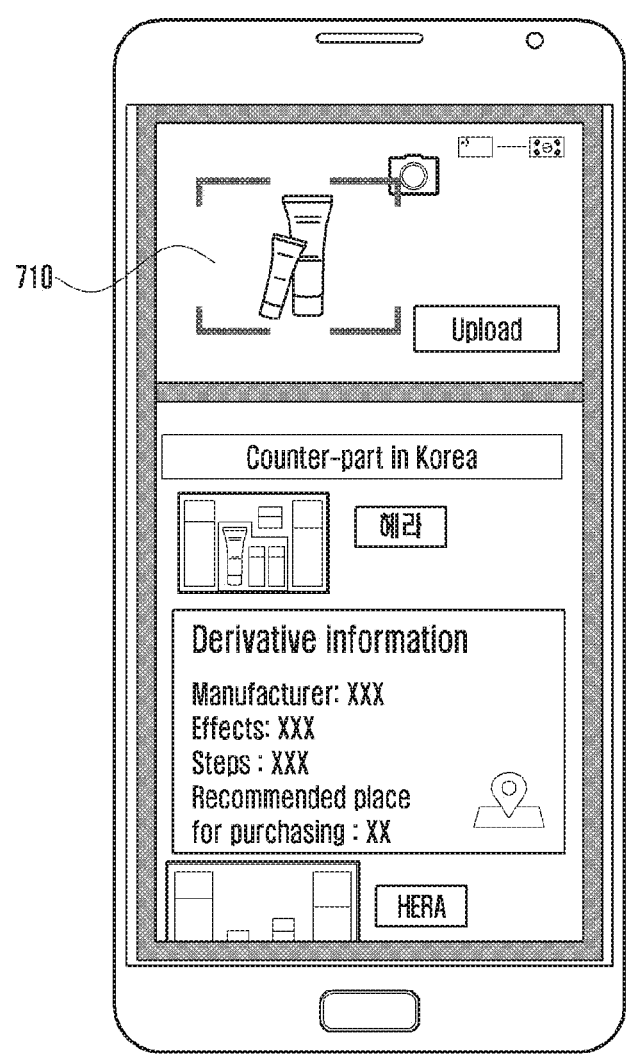
FIG. 7 illustrates derivative translation of multiple objects according to the fourth embodiment of the present disclosure.

Second, derivative translation is generated according to the target language. The specific method is identical to the translation method as described with reference to FIG. 6, when automatically comparing the source object and the target object, and will not be repeated here. As illustrated in FIG. 7, the derivative information of cosmetics includes, but is not limited to, manufacturer (or place of origin), effects (or functions), steps (or usage), and recommended places for purchasing.

IV. Automatic Comparison Between the Source Object and the Target Object

If a plurality of objects is input, the process for comparing the plurality of source objects and the translation results is as follows:

In step 1, a comparison mode is enabled. If the plurality of input objects belongs to combined object, the system will provide a combined object comparison mode, in the same manner as inputting a single object. Specifically, the combined object comparison mode is activated by setting a compare button near the combined object in the display area of the target object, performing a certain gesture operation, triggering a preset voice instruction, or automatic triggering by the system.

If the plurality of input objects does not belong to a combined object, a single object comparison mode is provided for each source object and the translated object corresponding thereto. The method for activating the single object comparison mode has been described above with regard to automatic comparison between the source object and the target object, and will not be repeated here.

Figure 8:
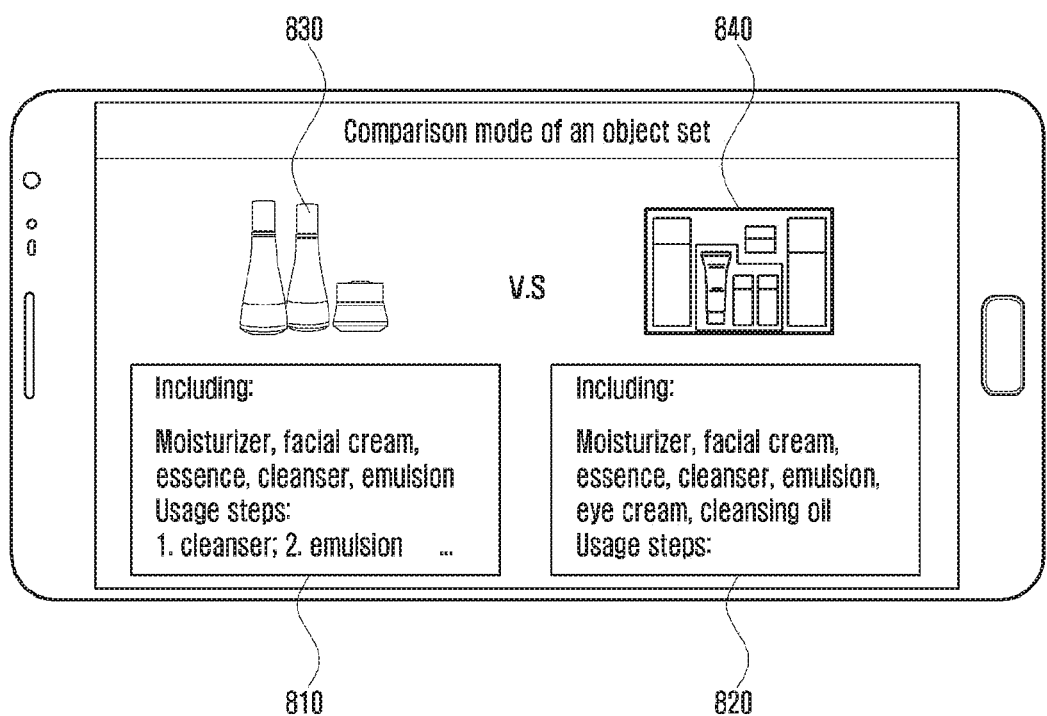
FIG. 8 illustrates automatic comparison between source objects and target objects of multiple objects according to the fourth embodiment of the present disclosure.

In step 2, comparison information is displayed in the terminal apparatus, in a similar manner as automatically comparing the source object and the target object described above with reference to FIG. 6. The display in the terminal can be by a single screen, or as illustrated in FIG. 8, which illustrates automatic comparison between source objects and target objects of multiple objects according to the fourth embodiment of the present disclosure, by left section 810 and right section 820 in a horizontal screen. The source and target objects can also be displayed up and down by a vertical screen, and displayed in the terminal by two screens, with one screen displaying key information of the source object and the other screen displaying the key information of all the target object candidates, in which case the target object candidates are switched by scrolling up and down, or sliding left and right. Displaying key information of the source object and of the target object can also be performed by voice broadcasting, and difference information can be highlighted or border selected. For example, different dosages and usages of cosmetics on the left section 810 and the right section 820 in FIG. 8 can be highlighted.

If the mode is a comparison mode of a combined object, objects included in the source section and objects included in the target section are required to be respectively exhibited in the comparison interface, and then derivative information of the combined object is compared. If the mode is a comparison mode of a plurality of individual objects, key derivative information of each source object and target object is required to be respectively compared in the comparison interface.

The method for comparing information and the compared content includes looking up a source combined object from the knowledge graph, if the terminal sends an instruction of enabling the comparison mode of a combined object, and extracting corresponding information of the source combined object in accordance with the key information of the target combined object. Objects included in the source combined object and the target combined object are listed. The operating includes matching the source combined object with the target combined object, by calculating similarity in features between each two objects, such as names, functions, and ingredients. If unmatched objects are included in the source combined object and the target combined object, the unmatched objects are prominently displayed, such as by bold type, italicizing, or highlighting. If the terminal sends an instruction of enabling the comparison mode of a plurality of individual objects, according to the results of matching, if there are successfully matched objects, the key information is compared and extracted by automatically comparing between the source object and the target object, as previously described.

Specifically, a source object is looked up from the knowledge graph database, and corresponding information of the source object is extracted in accordance with the key information of the target object. For example, as illustrated in FIG. 8, if the target object is a cosmetic set, the key information thereof includes place of origin, functions, suitable consumers, usage, usage steps, and stores where the product may be purchased, which are looked up from the knowledge graph. If the language of the source object is different from that of the terminal apparatus system (or target output language set by a user) in the knowledge graph, the language of the source object is translated into the language of the terminal apparatus system. Then, the key information of the source object and the key information of the target object are transmitted to the terminal apparatus in the language of the terminal apparatus system to be displayed.

In FIG. 8, similarity between the source object 830 and the target object 840 is calculated and matched by the method. If there are unmatched objects in the source combined object and the target combined object, for example, "eye cream" and "cleansing oil" in 820, when the object types included in the two sets are displayed, the unmatched objects are prominently displayed by highlighting or italicizing. Contents such as usage steps of the source set and the target set can be displayed. If the terminal sends an instruction of enabling the comparison mode of a single object, similarity between each two objects, i.e., the source object and the target object, is calculated and matched by the method, and the matched objects are compared and displayed.

Since passive translation does not sufficiently meet a user's requirements, the concept of derivative information is disclosed in the fourth embodiment of the present disclosure, which allows the translated content to be analyzed to provide derivative information related to the translated content. The translated content can be supplemented and a user's understanding of the translated content is enhanced.

Fifth Embodiment

Figure 9:
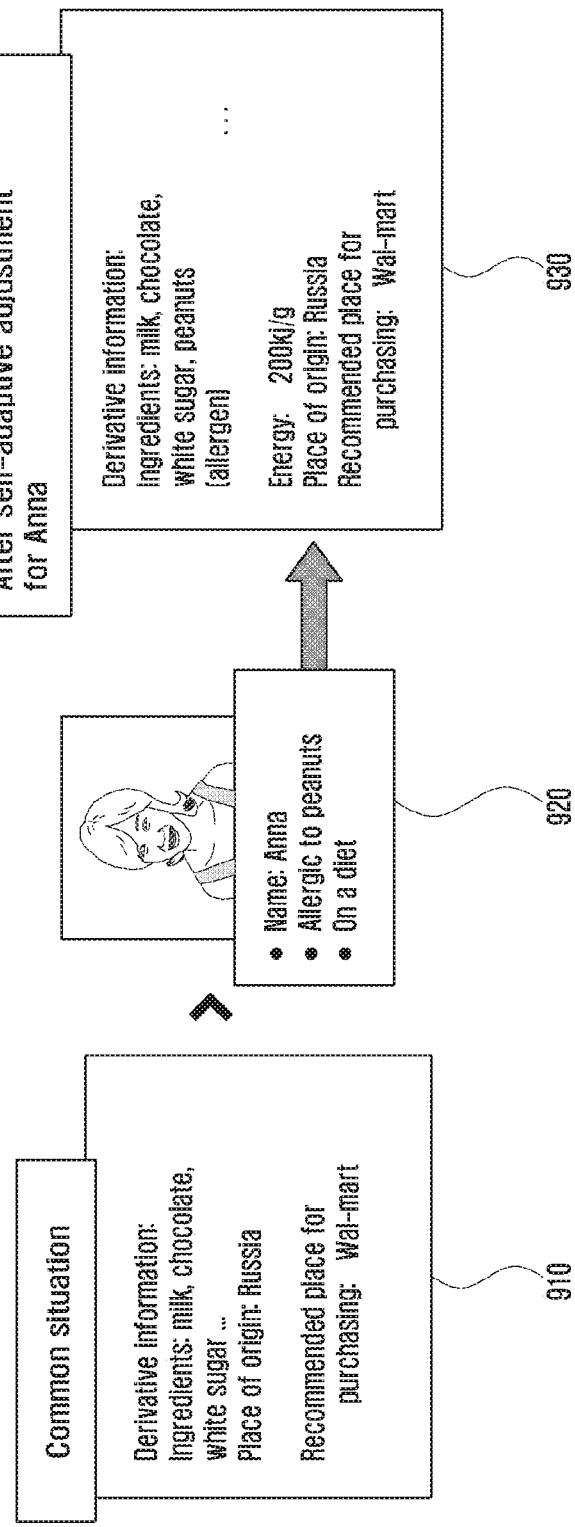
FIG. 9 illustrates personalized derivative information according to a fifth embodiment of the present disclosure.

FIG. 9 illustrates personalized derivative information according to a fifth embodiment of the present disclosure. Specifically, to enable a translation result to be better tailored to a user's personalized requirements, the fifth embodiment of the present disclosure provides a solution for translating object information based on the personal information of a user.

For different users, the method in the fifth embodiment of the present disclosure will supplement personalized derivative information, and will include acquiring the source-object information and displaying the translated target-object information.

The acquired information can also include the personal information of a user. The personal information of a user is acquired by acquiring, by the terminal, schedule information of a user by analyzing information recorded by a user's calendar and/or memo software, acquiring, by the terminal, information regarding a user's interests and hobbies by analyzing information recorded by a user's mail box, text messages and/or call records, acquiring, by the terminal, environment information of a user by a camera, a microphone, a sound sensor, a light sensor and/or a moisture sensor, acquiring, by the terminal, information such as a user's motion state by a speed sensor, and acquiring, by the terminal, information such as a user's health state by application software.

Before the translated target-object information is displayed, the derivative information is adjusted according to the personal information 910 of a user. When the terminal collects personal information of a user, the personal information of the user is combined with the present derivative translation to rank and annotate the derivatively translated content, by analyzing the relevancy between the derivatively translated content and a user's information, grading the derivatively translated content according to the relevancy with the user's information, and highlighting the derivatively translated content having high relevancy. The analysis of relevancy can be implemented by calculating information entropy, or KL divergence (Kullback Leibler, relative entropy), for example.

As illustrated in FIG. 9, if content about dieting is detected from a user's schedule 920 according to the method of step 1 and there is content recorded in a health application that the user is allergic to peanuts, for this user, the system highlights information such as allergens and energy at a prominent position of derivative information of object translation in order to alert the user. As illustrated in FIG. 9, in a derivative information region 930 of a terminal screen, such sensitive content is put forward and/or highlighted. The displaying is performed by exchanging the order for displaying the content, highlighting, bolding on the terminal screen, or alerting a user by vibrating the terminal or triggering a sound.

I. Optimization of Object Information Translation Based on Location.

The present disclosure considers that the existing machine translation technologies do not fully consider location information and personalized information of a mobile apparatus user, and the translation is not adjusted according to a translation occasion or a user's requirements. Understanding of a certain concept might vary greatly for users from different regions. For example, in English, "sunscreen" might be a sun-blocking or suntan cream, while for the Chinese market, sunscreen is generally a sun-blocking cream. Thus, sunscreen can be translated into a sun-blocking cream in China. However, for Chinese traveling in Europe and the Americas, if "sunscreen" is still translated as sun-blocking cream indiscriminately, a user may be misled, since "suntan" may not be considered, consequently leading to an errant purchase.

Accordingly, in the fifth embodiment of the present disclosure, by collecting the location of a user by an apparatus sensor, an object alignment model for object translation can be optimized according to different locations of the user, so that translation of object information is more accurate. That is, the source-object information is acquired and the translated target-objet information is displayed.

Specifically, the acquired information includes nationality and race of a user, and the terminal determines this information by analyzing information of a location frequented by the user or a language used by the user.

When the system is translating object information, an object translation result is optimized by referring to combining information such as the location, nationality and race of the user. Object categories <source object, source language, target language> are defined. If the translated target object candidates corresponding to the translation of the source object do not completely belong to identical object type, it is indicated that the source object is ambiguous in the target language. For example, when "sunscreen" is translated into "sun-blocking cream" or "suntan cream", an object ambiguity <object represented by "sunscreen", English, Chinese> is formed.

After the terminal determines the translation orientation of the source object and the target object by step S2 of the second embodiment, it is determined whether the current source object is ambiguous according to an object ambiguity library. If the current source object is ambiguous, the translation model (i.e., the object alignment model) is optimized according to ambiguous information related to the source object in the knowledge graph database, by extracting the text feature of the source object, and grading translation candidates by an object ambiguity classifier. The text feature here includes derivative information of the source object.

Figure 10:
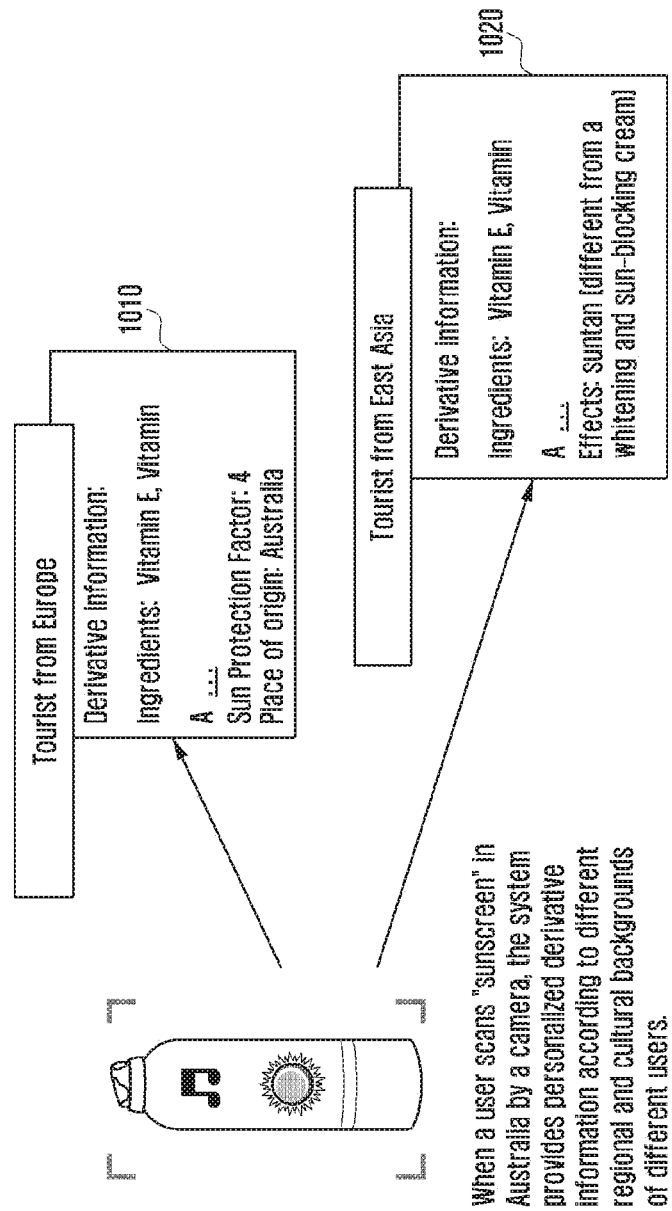
FIG. 10 illustrates disambiguation based on a location-based translation result according to the fifth embodiment of the present disclosure.

For example, FIG. 10 illustrates disambiguation based on a location-based translation result according to the fifth embodiment of the present disclosure. The derivative information 1010 included in FIG. 10 is content, such as, "place of origin: Australia; sun protection factor: 4; effects: suntan". The specific method for establishing an object ambiguity analysis classifier includes extracting the above text feature by a supervised discriminative model training method, classifying and training the translation candidates to obtain scores of different translation candidates corresponding to an identical ambiguous object under different text features, and adding the scores to the translation model as features so as to help the translation system to optimize the final translation candidates. As shown in FIG. 10, the system automatically determines whether an ambiguity classifier is used according to the nationality of a user. If the user is a European 1010, the translation result is directly provided. If the user is an Asian 1020, the translation system adds scores from an ambiguity classifier as features, and outputs the translation result, "suntan cream", after the translation result is disambiguated. Alternatively, the translation system reminds the user, in derivative information, that the translation result might be ambiguous, such as by prominently displaying the content related to ambiguity by highlighting or bold type, by adding a warning icon, by popping up a warning window on the terminal screen, or by a voice reminder.

In the above-described method, establishing an object ambiguity library and automatically judging an ambiguous object is performed by analyzing, based on the method for establishing the object alignment model as described in step S2 of the second embodiment, the type of target object candidates corresponding to each source object, as described in step S4 of the second embodiment. If the target object candidates do not belong to an identical type, a category designation <source object, source language, target language> is added into the object ambiguity library. It is determined by whether the categories are in the object ambiguity library, whether an object which is being translated is an ambiguous object is inquired. If the triple thereof is in the object ambiguity library, a return value is YES; otherwise, the return value is NO.

The method for establishing a knowledge graph with a function of reminding ambiguous information includes looking up, based on the method for establishing a knowledge graph in the second embodiment, by an object ambiguity library and an alignment model, a target object corresponding to an ambiguous object, and adding the target object with an ambiguity tag on the knowledge graph.

II. Self-Adaptive Translation in Social Networks

Figure 11:
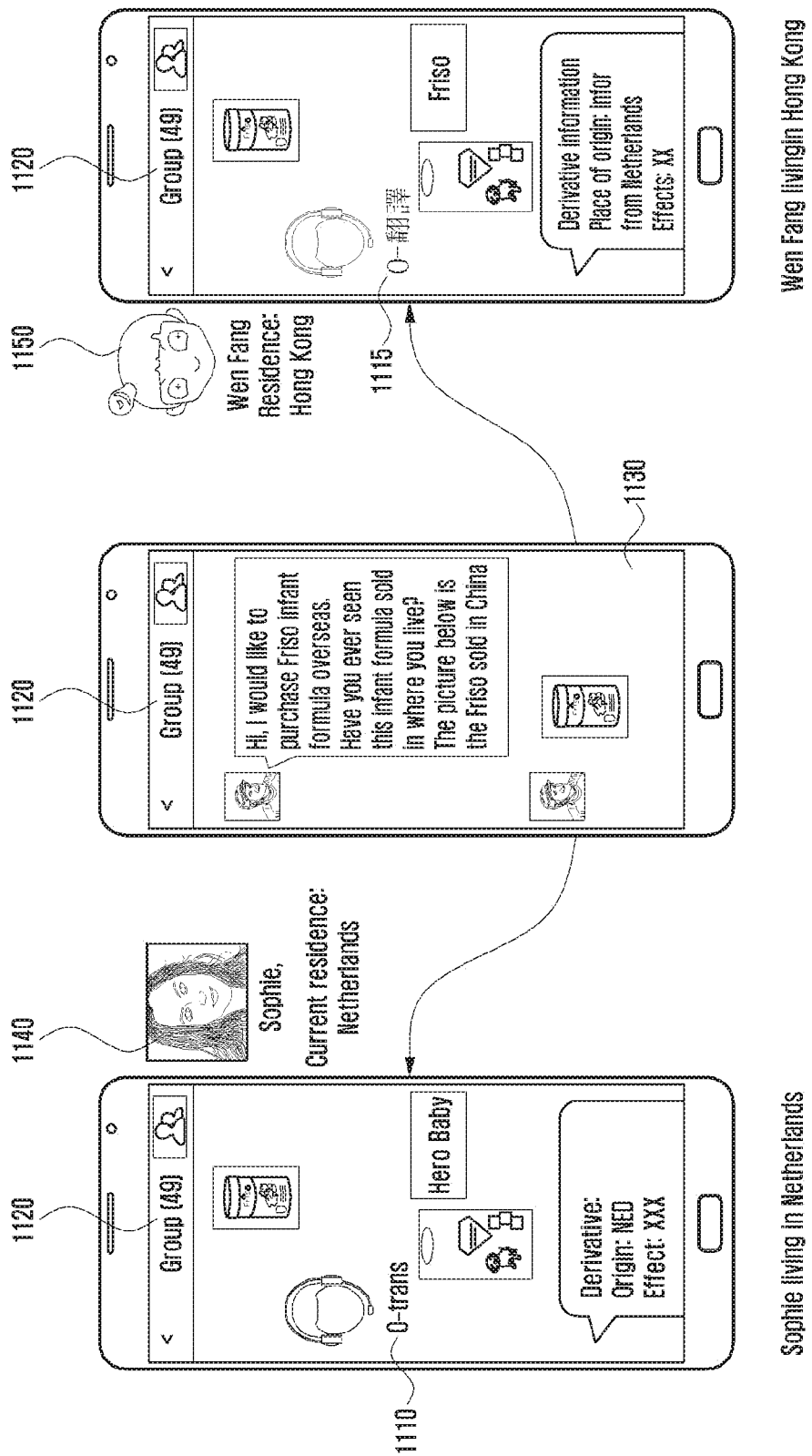
FIG. 11 illustrates object translation in a social network according to the fifth embodiment of the present disclosure.

FIG. 11 illustrates object translation in a social network according to the fifth embodiment of the present disclosure.

Specifically, the present disclosure also provides an entrance for enabling a group chat function in an object translation system and/or an entrance for enabling object translation in social software, by long pressing or sliding, and then uploading image information of a source object to an object translation system of a server or of the terminal according to step S1 of the second embodiment. The enabling can also be performed by setting a translation button 1110, 1115 in a social software interface, and enabling the object translation according to a user's operation. The social software can be group chat 1120 software/application, and can also be software/application with a conversation function.

The output of the corresponding translation results for each person can be according to whether terminal translation on a single side is used, including the following two situations.

1). Based on the information of a receiver, a sender requests the system to translate an object and then sends a picture.

The sender collects location information of the receiver by the terminal GPS/wifi/3G and social networking. Region and nationality of the target object are determined. The sender sends a request to the translation system according to the location of each terminal, in order to translate the source object to a corresponding target object and generate derivative translation. Then, the sender sends the translation result to each receiver. The translation result here can include texts, pictures, audio and video.

2). An object picture is sent, and the receiver requests the system to translate the object.

The receiver collects the current location of the user by the terminal GPS/wifi/3G. Region and country of the target object are determined. The receiver sends a request to the translation system according to the location of each terminal, in order to translate the object transmitted from the source object to a corresponding target object and generate derivative translation.

As shown in FIG. 11, when a user in mainland China translates "Friso", as shown in 1130 in group chat software, although in the identical chat interface, Wen Fang in Hong Kong 1150 and Sophie in Netherlands 1140 in the group will receive different translation results which are locally adaptive. In the chat interface of Wen Fang in Hong Kong 1150, a corresponding object picture and derivative information of the object in Hong Kong will be displayed. In the chat interface of Sophie in Netherlands 1140, a corresponding object picture and derivative information of the object in Netherlands will be displayed.

III. Self-Adaptive Derivative Translation of a Slogan

Figure 12:
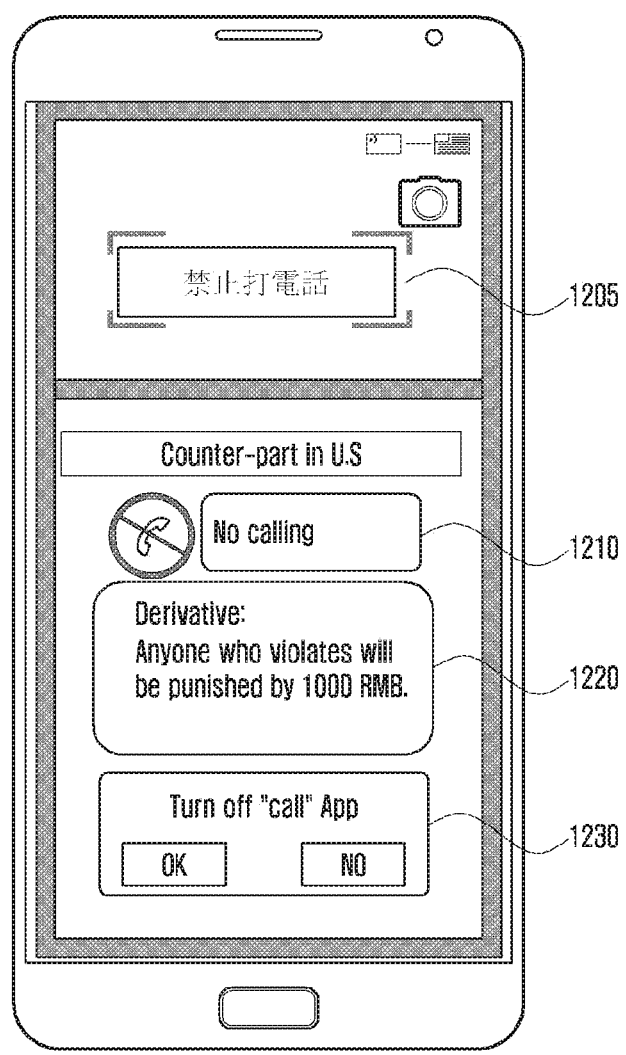
FIG. 12 illustrates derivative translation of slogans according to the fifth embodiment of the present disclosure.

FIG. 12 illustrates derivative translation of slogans according to the fifth embodiment of the present disclosure. Specifically, when the input object is a slogan, the present disclosure provides a method for automatically generating derivative translation of the current slogan related to the local laws and regulations according to the current location or region, by acquiring the source-object information and displaying the translated target-object information.

Acquiring the source-object information is performed as disclosed in step S1 of the second embodiment, and will not be repeated here.

The method for analyzing and recognizing a slogan and generating derivative information includes recognizing an object according to step S2 of the second embodiment, and if the object is a slogan, translating the slogan and generating derivative information related to the local laws and regulations.

It is recognized whether an object is a slogan by establishing a multi-language common slogan database, and after character recognition is performed on the input object, matching the texts with sentences in the slogan database. If the texts are matched with sentences in the slogan database, it is determined that the object input currently is a slogan. Otherwise, the object is translated as a general object.

The method for generating derivative information related to the local laws and regulations includes acquiring the current region of the terminal by the terminal GPS/wifi/3G, and inquiring regulation items containing the translated content from a regulation database. The method for establishing the regulation database includes establishing regulation and policy databases of different regions for common slogans, and automatically extracting related clauses from texts on law/regulation websites. Alternatively, the regulation database can be established by manual marking.

According to different cultural backgrounds of the regions of slogans, slogan translation involves the following three situations.

1) The slogan or signboard exists in language environment A, but does not exist in language environment B.

If the signboard in the source has no corresponding sign in the target, only texts in the source signboard are translated, and derivative translation as described above is provided. For example, a signboard "right of way" in FIG. 18A exists in Europe but not in China. In this case, when the signboard is translated into Chinese, the meaning of this signboard in the local region and the derivative information thereof are output in the target at the terminal.

2) A and B are different in pattern but identical in meaning.

A picture feature and a text feature are extracted according to the method as described in step 2 and then translated, and a corresponding signboard (may not be identical) in the target language and the derivative translation thereof are displayed in the terminal.

3) A and B are identical in pattern but different in meaning.

In this case, a signboard corresponding to A and the derivative information thereof obtained in combination of the picture feature and the text feature are output according to the method as described in part 2). If there is no corresponding signboard, the meaning and derivative information of the signboard are output as described in part 1).

FIG. 12 illustrates derivative translation of slogans according to the fifth embodiment of the present disclosure.

As illustrated in FIG. 12, the terminal detects that an object 1205 is input and finds that the object is a slogan "no calling" 1210 by system recognition, and the current location thereof is detected by the terminal. According to the location information and the text information of the slogan, it is searched from the regulation database that a penalty rule for those who violate the regulation in the local region is "Anyone who violates will be punished by 1000 RMB" 1220. Thereafter, the penalty rule is translated into the terminal system language (or a target language set by a user), and displayed on the terminal screen.

If this slogan involves an operation of a designated APP, association with the APP is performed. For example, in FIG. 12, since "no" and "calling" involve an operation of a terminal voice communication APP, the terminal will automatically associate with the APP and pop up a warning message "Turn off call App" 1230.

IV. Personalized Event Reminder Based on Derivative Translation

Figure 13A:
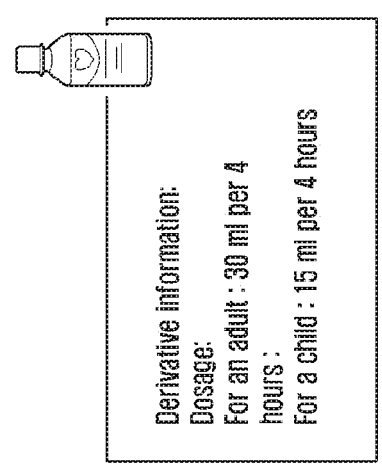
FIG. 13A, FIG. 13B, and FIG. 13C illustrate a derivative translation-automatic reminding function according to the fifth embodiment of the present disclosure.
Figure 13B:
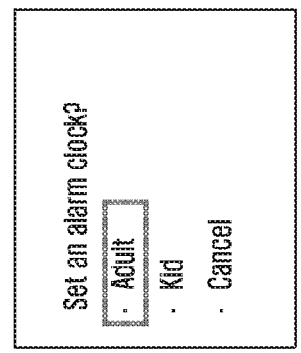
Figure 13C:
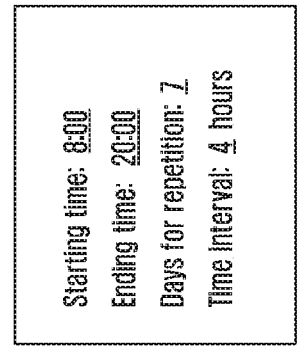

FIG. 13A, FIG. 13B, and FIG. 13C illustrate a derivative translation-automatic reminding function according to the fifth embodiment of the present disclosure. As such, reminders can be set for a user and can be automatically adjusted.

For example, when objects such as drugs are translated, if the translation system detects that information such as time intervals and numbers is contained in the derivative translation, the translation system will set a personalized reminder event for a user. When it is detected that a user has set a reminder event, based on the comparison information in the derivative information, the reminder can be altered self-adaptively. The reminder can be applied to smart terminals such as a mobile phone, a wearable apparatus or other smart apparatuses.

The specific implementation involves acquiring source-object information and displaying translated target-object information.

The acquisition is based on step S1 of the second embodiment, and detecting whether a reminder event is set on the terminal apparatus, and judging whether the reminder event is related to the content being translated currently according to the content of the reminder event.

The method for detecting whether a reminder related to translation exists in the reminder of the current apparatus involves determining, according to relevancy between the translated content and the content, the reminder of the apparatus. For example, similarity of text keywords is calculated according to the translated content and the content of the reminder of the apparatus. The calculation can be performed by cosine similarity or edit distance. For example, in FIG. 13A, an event keyword "dosage" is extracted from the derivative translation. If the current apparatus detects that themes of the existing reminder events are respectively "dating", "taking medicine", and "birthday", the "taking medicine" reminder event is determined as the reminder event related to the content translated currently, since the most vents related to the "dosage" event are found by calculating by semantic similarity. Apart from calculating similarity according to keywords, whether the reminder content is related to the existing reminder content can be determined by the semantically distributed representation of the texts or by calculating the theme similarity of texts.

Displaying the translated target-object information is based on step S2 of the second embodiment. The system will perform automatic text analysis on the translated content. If it is detected that a time interval is contained in the derivative translation, a reminder event is automatically generated or an existing reminder event is self-adaptively altered according to a user's information detected in the terminal. The content of the reminder includes information automatically extracted according to derivative translation, including, but not limited to, name, dosage, and time interval key information related to an object.

By step 1, if the terminal detects that no related reminder exists in the reminders of the current apparatus, a user is prompted, in the terminal, whether to add a new reminder, and different reminder subject options are automatically generated according to the text analysis result. Possible reminder options are generated in the terminal, as shown in FIG. 13B, and automatically two reminder objects are obtained by the text analysis of the derivative information, and reasonable time remainder suggestions are provided according to the time interval in the text and the user's average daily schedule.

As shown in FIG. 13C, a relatively reasonable time for reminding is automatically set according to the user's average daily schedule detected by the terminal and the time interval obtained by text analysis. If the terminal detects that a related reminder already exists in the reminders of the current apparatus, a user is prompted in the terminal whether to change the time for reminding, and a reasonable time for reminding is automatically set according to the user's daily schedule detected by the terminal and the time interval obtained by text analysis.

The user's daily schedule is detected by the terminal by detecting the enabled time in the morning and the dormant time at night of the terminal apparatus, and calculating an average value thereof. Alternatively, detecting the activity time of the user each day by a sensor of the apparatus, for example, a temperature sensor or a gyroscope, and calculating an average value thereof.

V. Multi-Modal Output of Translation Results

Figure 14B:
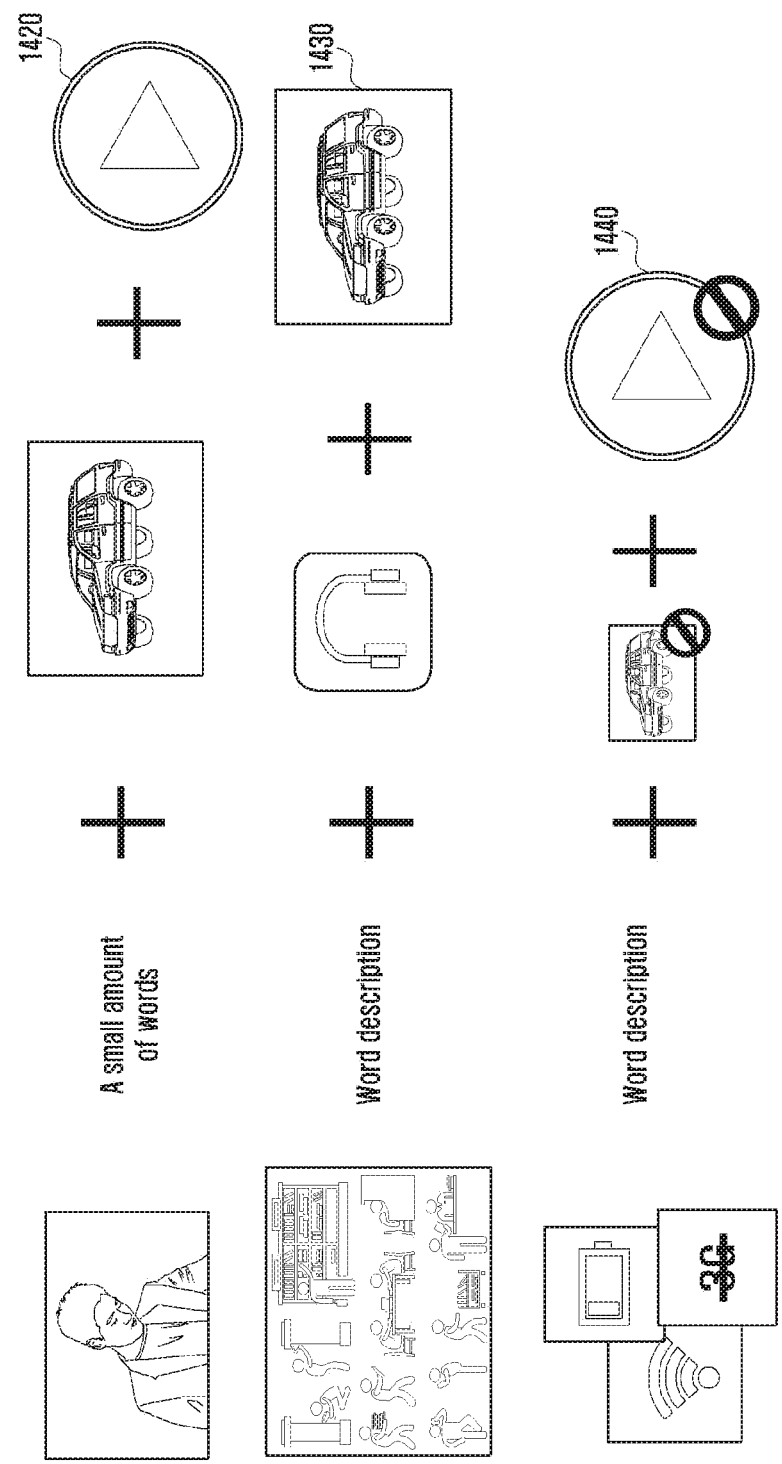

FIG. 14A and FIG. 14B illustrate multi-modal output according to the fifth embodiment of the present disclosure. The multi-modal output includes text descriptions, pictures, audio, and video. The output modality can be self-adaptively adjusted based on user's operations, environments of a terminal, current network conditions, or type of a terminal apparatus.

For example, in a normal mode, text descriptions and pictures of the target object, and voice, are output. If a video is contained in the derivative translation 1410 of the target object, as shown in FIG. 14A, the video can be output. If it is detected that a user sets a child mode, as shown in FIG. 14B, a small amount of texts, together with pictures and video 1420 are used in the translation result. If it is detected that the current environment is quiet, for example, scenes such as a library and a hospital 1430 as shown in FIG. 14B, text descriptions and pictures are used in the translation result. Audio or video can be provided, and a warning is provided before playing the audio and video. If it is detected that the current network/data signal is poor or that the terminal is low in electric power, as shown in FIG. 14B, text descriptions and compressed pictures 1440 are used in the translation result.

Due to difference in aspects such as language, culture and cognition of different users, geographic location of an identical user when using machine translation in a mobile apparatus or a wearable apparatus constantly changes. The fifth embodiment of the present disclosure gives consideration to the location information of the occurrence of translation and the personal information of a user, so that the translation result and the derivative translation are better tailored to a user's actual requirements.

Sixth Embodiment

The present disclosure considers that the existing machine translation technologies concern how to apply machine translation in mobile apparatuses such as a mobile phone and a pad, without full discussion about how machine translation can be applicable to multiple users and multiple apparatuses, such as watches and glasses. As the capability of wearable apparatuses to process data is increasing and the wearable apparatuses are becoming widespread, such that machine translation is ported to a wearable apparatus, it is paramount to improve the quality of translation in such devices.

Figure 15A:
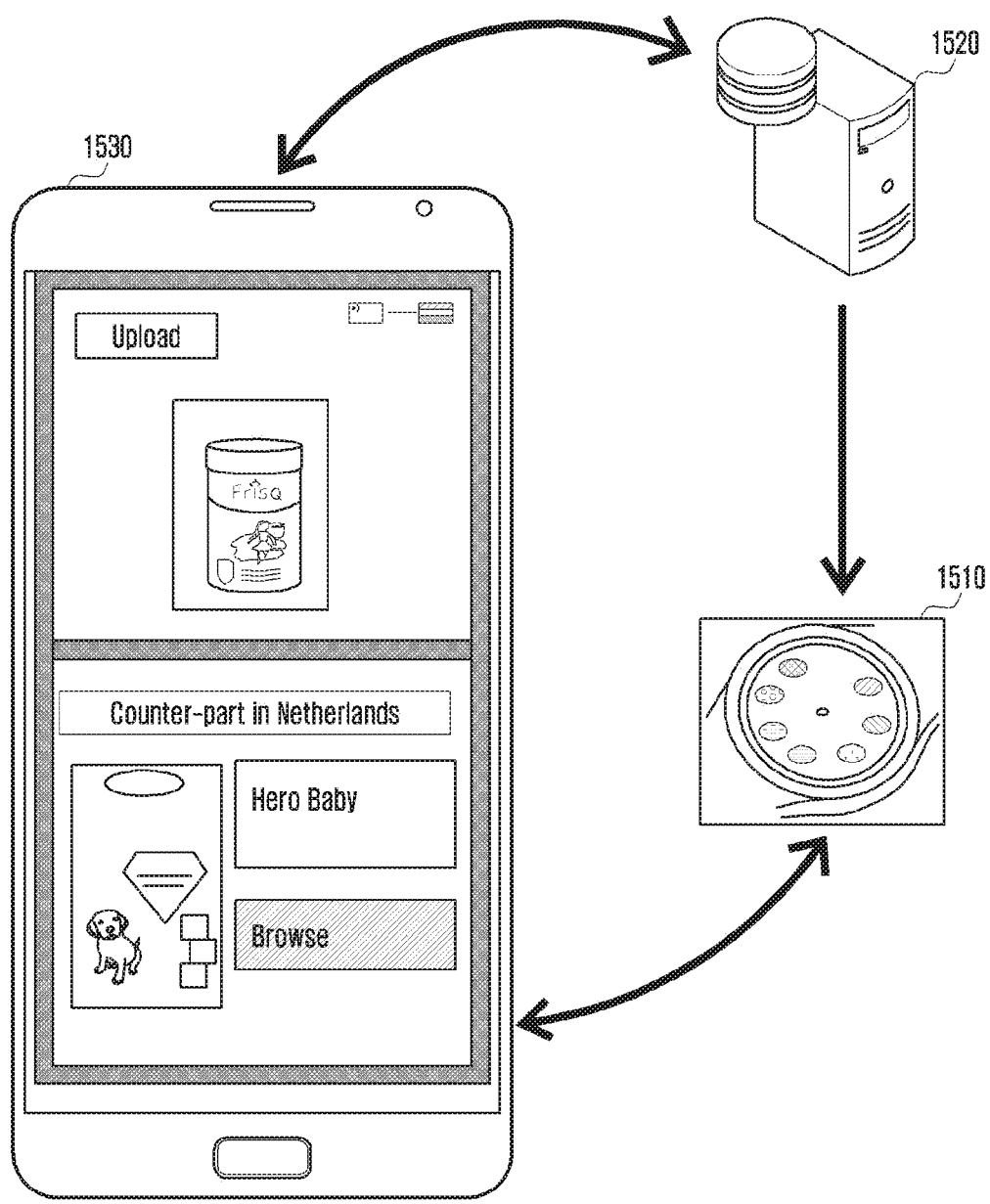
FIG. 15A and FIG. 15B illustrate translating the object information on a smart watch according to a sixth embodiment of the present disclosure.
Figure 15B:
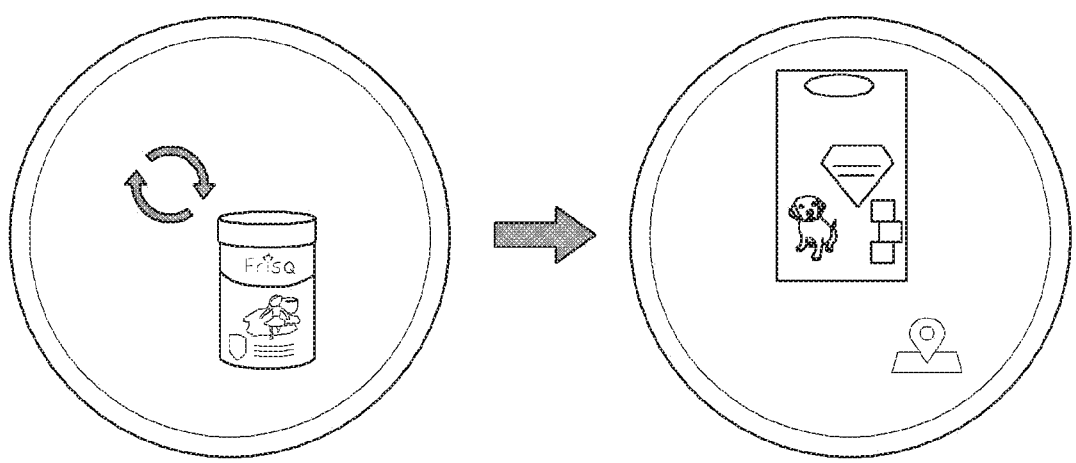

Thus, FIG. 15A, and FIG. 15B illustrate translating the object information on a smart watch according to a sixth embodiment of the present disclosure, which further provides translating for a plurality of users and improving quality of translation according to a large amount of data from the users.

I. Object Information Translation Applied to a Smart Watch

A watch tends to be more convenient to carry than terminals such as a mobile phone 1530. Thus, the sixth embodiment of the present disclosure provides an object translation which can be applied to a smart watch.

A source object can be detected, uploaded and synchronized by communicating by a watch, other terminal apparatuses (such as a mobile phone/PAD) and a server by using a smart watch only as an input apparatus and/or output apparatus, detecting, by a camera of the smart watch or by other terminal apparatuses, a source object, transmitting the detected result to the terminal apparatus or uploading the detected result to the server for translation, and transmitting the translation result back to the terminal apparatus and/or the watch. After the terminal apparatus obtaining the translation result self-adaptively adjusts the translation result according to the size of the dial of the watch, the method further includes transferring the translation result to the watch for displaying, as shown in FIG. 15A and FIG. 15B, and using the smart watch 1510 as a smart terminal apparatus, and after a source object is detected by the watch 1510, transmitting the picture of the source object to an object translation system of the watch or uploading the picture of the source object to the server 1520 for translation. The translation result can be self-adaptively adjusted and returned back to the watch by the server.

The translated target-object information is displayed, along with displaying part of the derivative translation.

When the translation result is returned back to the watch 1510, the translation result will be self-adaptively adjusted. The method includes, but is not limited to, self-adaptively adjusting the size of an object picture, automatically abstracting descriptive texts, displaying the fewest number of texts as possible, and providing no video for the derivative translation. Alternatively, adjusting the translation result based on a user's operation, for example, detecting whether a user selects the entire text or the abstract, detecting whether a user enables an audio playback setting, and detecting whether a user selects a video playback setting.

If keywords, such as time interval, are contained in the text of the derivative translation, the text is analyzed, and a reminder event is automatically generated. The time for reminding is set according to a user's daily schedule. A user's average time to wake up and average time to go to bed are automatically detected by the watch, and then a reminder event is set according to the time interval in the text.

Figure 16:
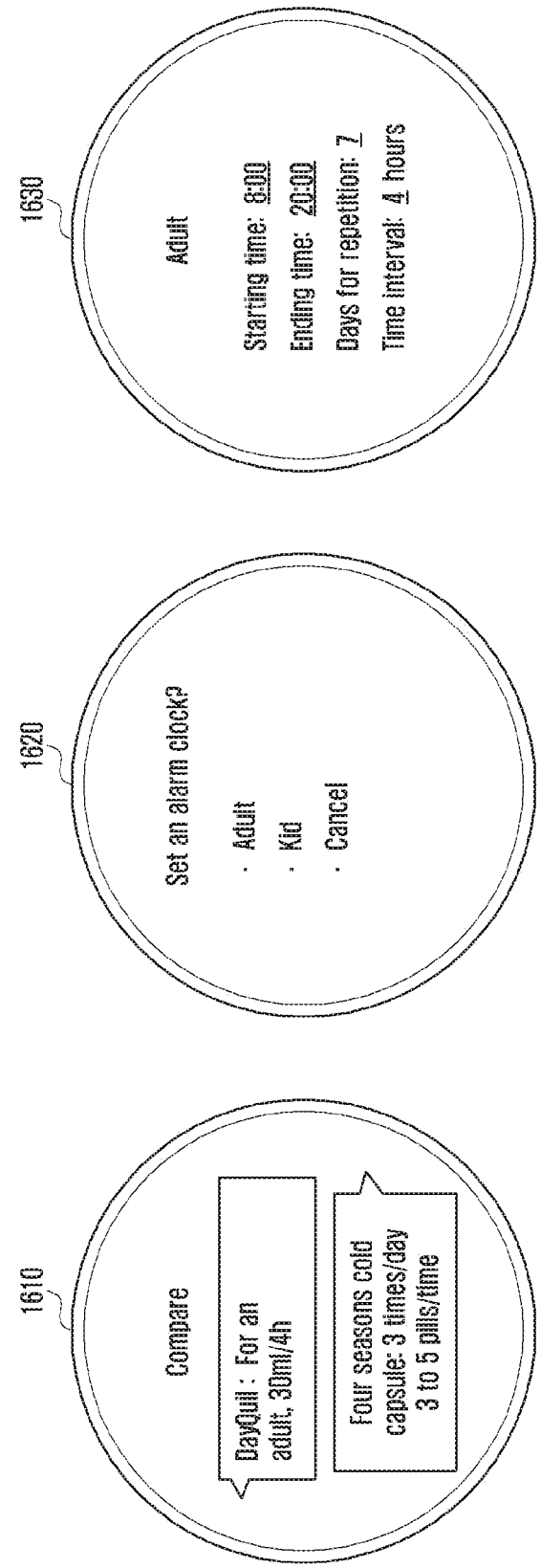
FIG. 16 illustrates a derivative translation-automatic reminding function on a smart watch according to the sixth embodiment of the present disclosure.

FIG. 16 illustrates a derivative translation-automatic reminding function on a smart watch according to the sixth embodiment of the present disclosure.

As shown in FIG. 16, the system detects that a time interval exists in the derivative translation, and finds several possible time intervals by text analysis. In this case, different options 1610 are generated and displayed on the dial. If it is detected that a user has selected ADULT 1620, the time for reminding is automatically set according the user's average daily schedule and the time interval of an adult 1630. The method is the identical as step 2 in the personalized event reminder solution based on derivative translation, and will not be repeated here.

II. Object Information Translation Applied to Smart Glasses

As for a translation system, smart glasses, as a wearable apparatus with the highest synchronous rate with the motion of human eyes, compared with other terminals, have great advantages such as capturing a source object in real time and hands-free operation. Thus, FIG. 17A and FIG. 17B illustrate translating the object information on smart glasses according to the sixth embodiment of the present disclosure.

Figure 17A:
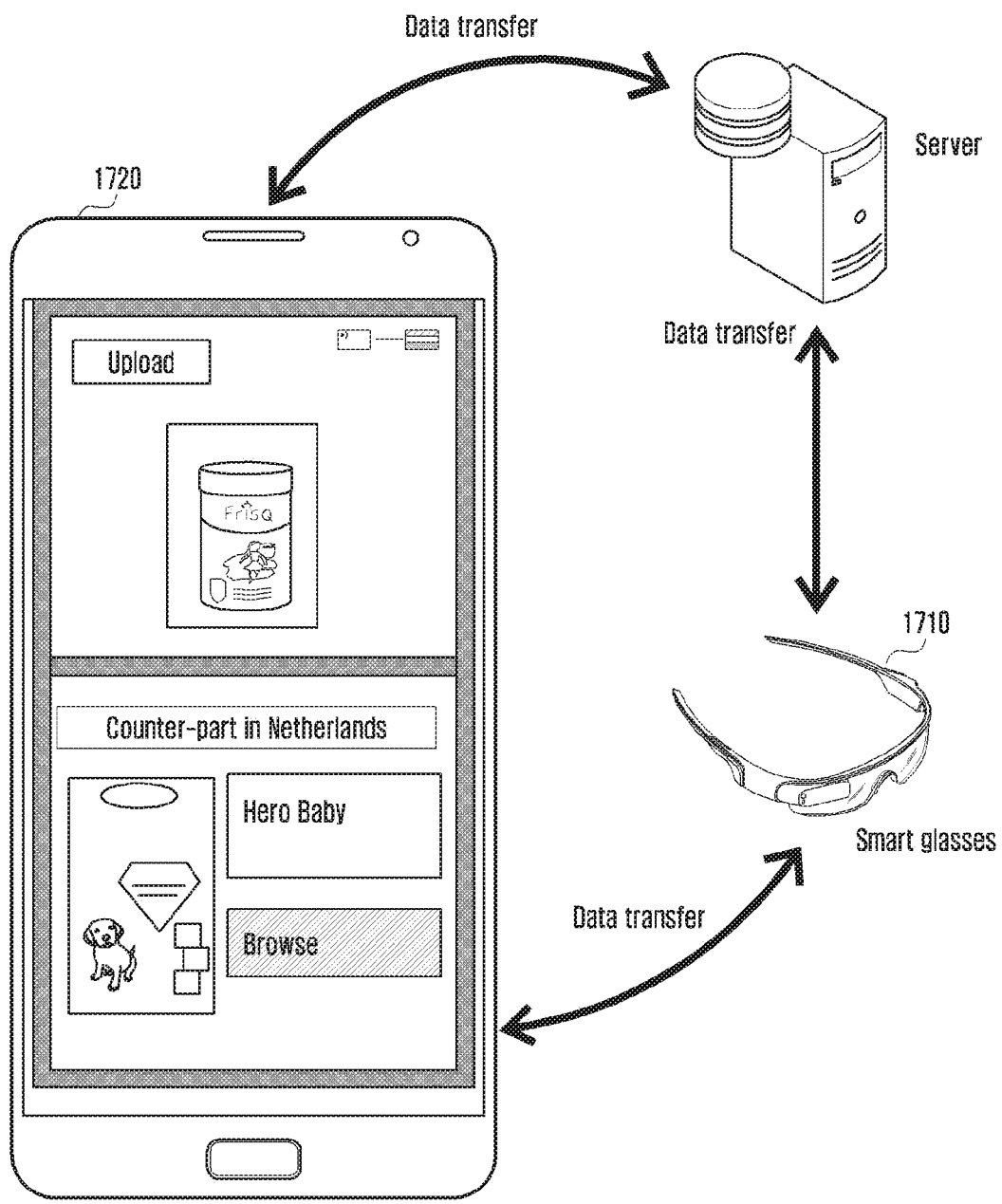
FIG. 17A and FIG. 17B illustrate translating the object information on smart glasses according to the sixth embodiment of the present disclosure.

As illustrated in FIG. 17A, if a pair of smart glasses 1710 is used as a display apparatus, data can be transferred by communicating a watch 1710 with terminal apparatuses such as a mobile phone 1720 and a PAD, in order to receive a source object, a target object and the derivative translation. This is identical to the communication as described in step 1 in the solution for translating object information applied to a smart watch, and will not be repeated here. If a pair of smart glasses is used as a smart terminal apparatus, on the basis steps S1 and S2 or steps S3 and S4 of the second embodiment, inputting by eyeball tracking and sight focusing is further provided. In browse mode 1730, information such as a picture of a source object is captured, by tracking eyeballs of a user or duration of sight on an object, or the location of sight focusing, and uploaded to the server for translation. Then, derivative translation is generated according to the step described in the derivative translation solution of a single object.

Figure 17B:
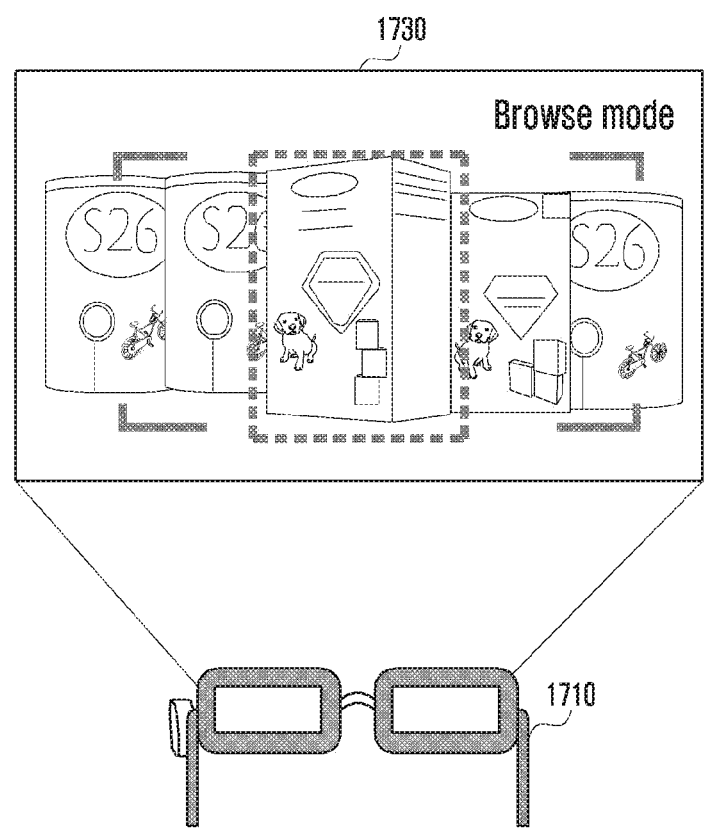

As illustrated in FIG. 17B, a target object is displayed on a pair of glasses, and derivative translation can also be displayed by displaying a target object and derivative translation on a pair of glasses by AR, for example, displaying the translation results by semitransparent overlay. To decrease disturbance on a user's sight, displaying the translation result on smart glasses is simpler than displaying the translation result on terminals such as a mobile phone screen. Displaying the translation result includes, but is not limited to, one of displaying only the most critical information, such as when translating a signboard, and displaying only the meaning of the signboard instead of displaying extra derivative translation. Alternatively, broadcast of the translated text can be performed by voice.

Figure 18A:
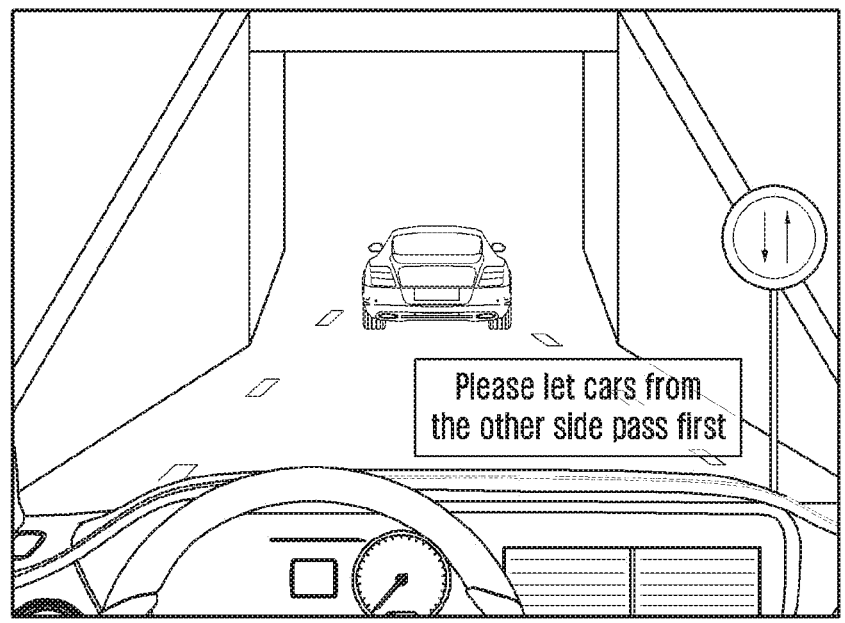
FIG. 18A and FIG. 18B illustrate machine translation of signboards applied to smart glasses according to the sixth embodiment of the present disclosure.
Figure 18B:
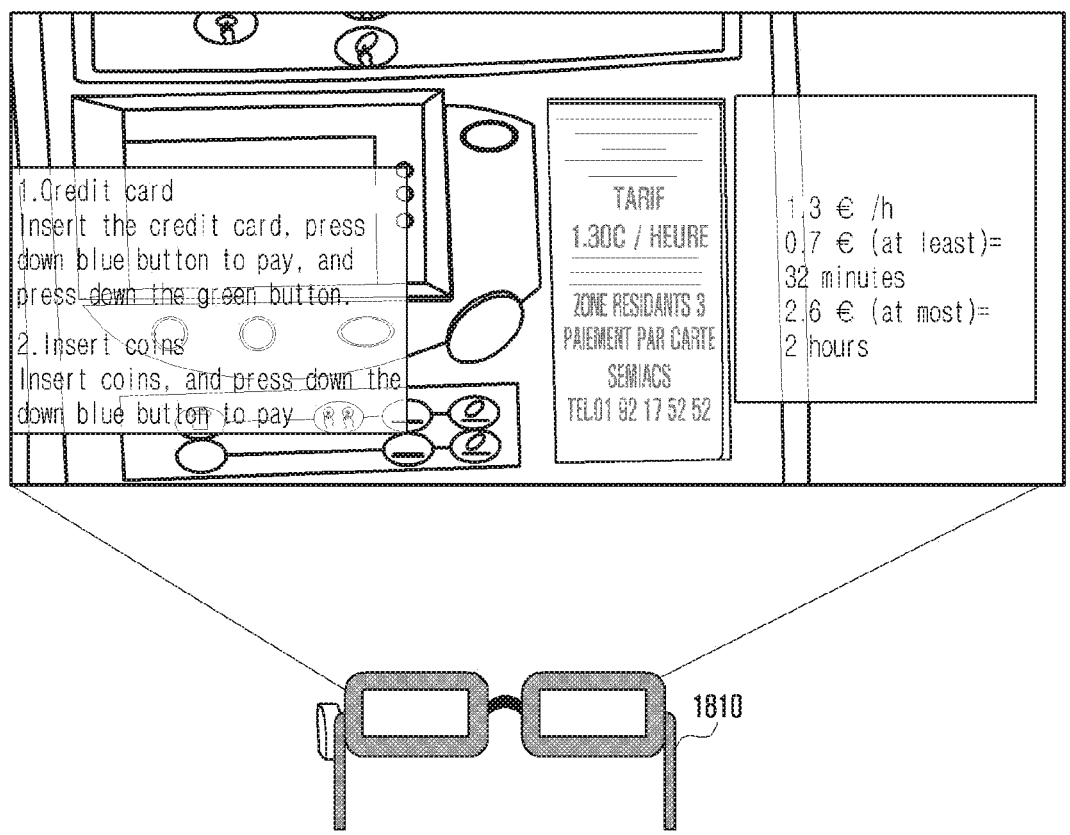

FIG. 18A and FIG. 18B illustrate machine translation of signboards applied to smart glasses according to the sixth embodiment of the present disclosure.

As illustrated in FIG. 18A and FIG. 18B, when a pair of smart glasses detects a signboard, the signboard is translated into a user's language and displayed on the smart glasses 1810, and broadcast in real time.

III. Feedback Mechanism for a User's Log Data

The sixth embodiment of the present disclosure also provides a solution for collecting a large amount of usage log data from a user as feedback to improve the quality of object translation, including the following three steps.

In step 1, a user's log is collected and analyzed, and the location information of a source object is collected.

The user's behaviors collected include the number of times for a user to click and view a target object, and the number of "thumbs-up" given by a user to a target object.

Figure 19:
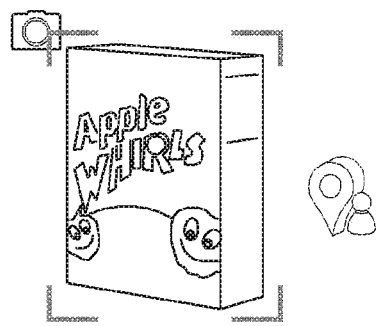
FIG. 19 illustrates collecting a user behavior log according to the sixth embodiment of the present disclosure.
Figure 19:
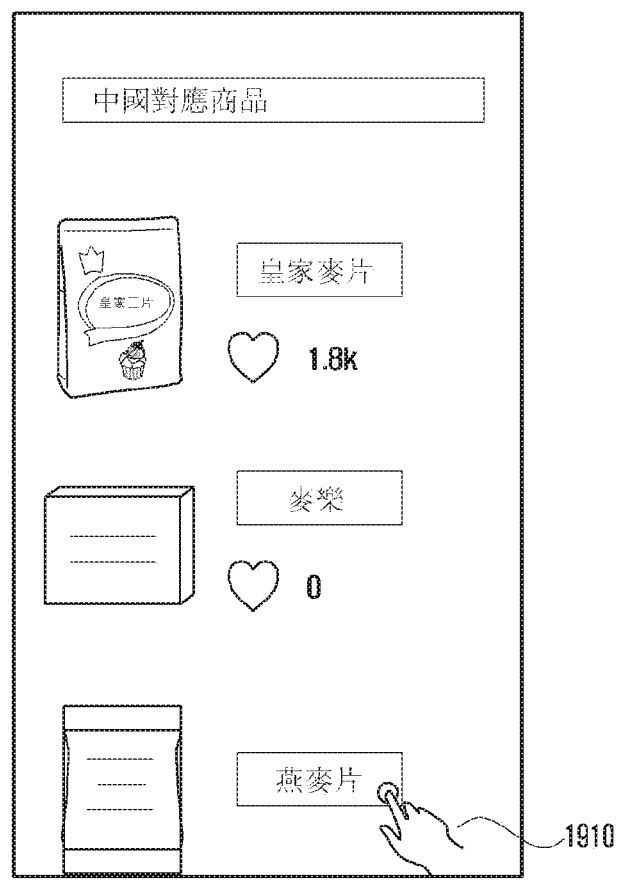

FIG. 19 illustrates collecting a user behavior log according to the sixth embodiment of the present disclosure.

As illustrated in FIG. 19, after the terminal detects that a user clicks a certain target object, the number of clicks on the target object is increased by 1, and after the terminal detects that a user gives "thumbs-up" 1910, the number of "thumbs-up" for the target object is increased by 1.

Collecting the location of a source object includes, when the terminal enables translation of object information, the current locations of the source object and the terminal are recorded, and whether the location is a source of the source object is automatically determined according to the characteristics of the location. If the location is a source of the source object, the location is added into the location information in the knowledge graph of the object.

In step 2, the updated translation result is displayed.

A model parameter is updated by a feedback mechanism. For example, a higher error weight is given to a target object with a low "thumbs-up" rate or a low clicking rate, and an alignment parameter in the alignment model is retained. The translation result is updated according to the retained alignment model.

IV. Feedback Mechanism for Crowdsourcing Translation

Figure 20:
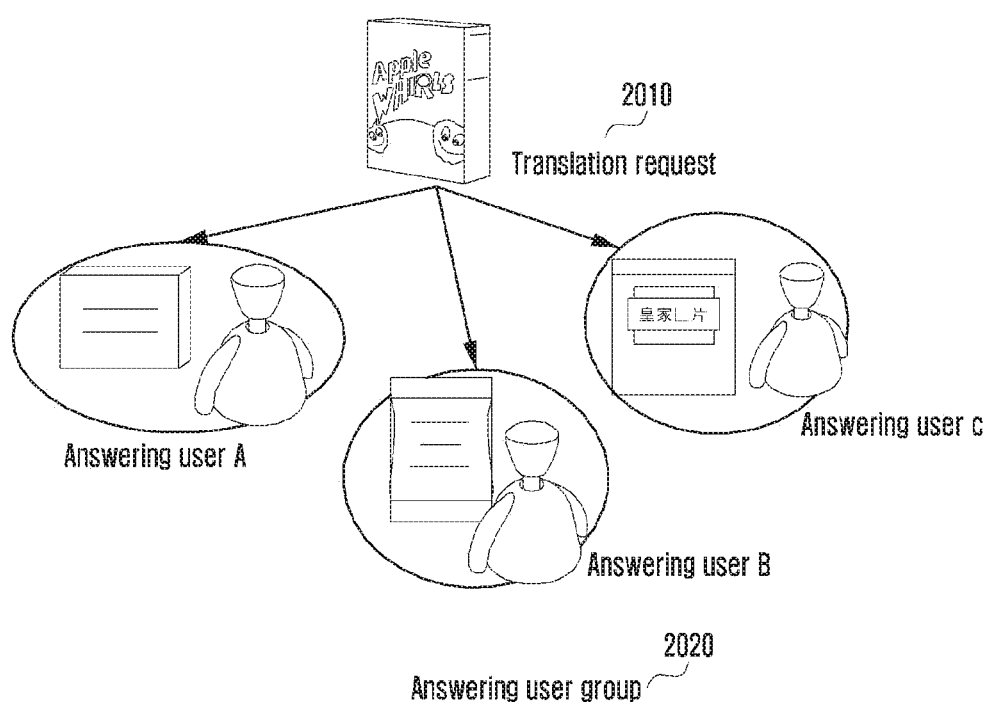
FIG. 20 illustrates a feedback mechanism for crowdsourcing translation according to the sixth embodiment of the present disclosure.

FIG. 20 illustrates a feedback mechanism for crowdsourcing translation according to the sixth embodiment of the present disclosure. The sixth embodiment of the present disclosure also provides a solution for optimizing the translation result by crowdsourcing translation. The process includes the following steps.

In step 1, translation tasks are distributed and the translation results are collected.

When the terminal sends a request for translating an object, in addition to performing the translation flow as described in the second embodiment, the translation request 2010 is pushed to other users 2020 to invite them to answer.

As illustrated in FIG. 20, users responding to this request are referred to as answering users, who to respond to a translation request by directly selecting an appropriate answer from the translation results, and if a user is not satisfied with all the candidates provided, submitting an answer by inputting pictures, text descriptions, and audio of the object.

Figure 21:
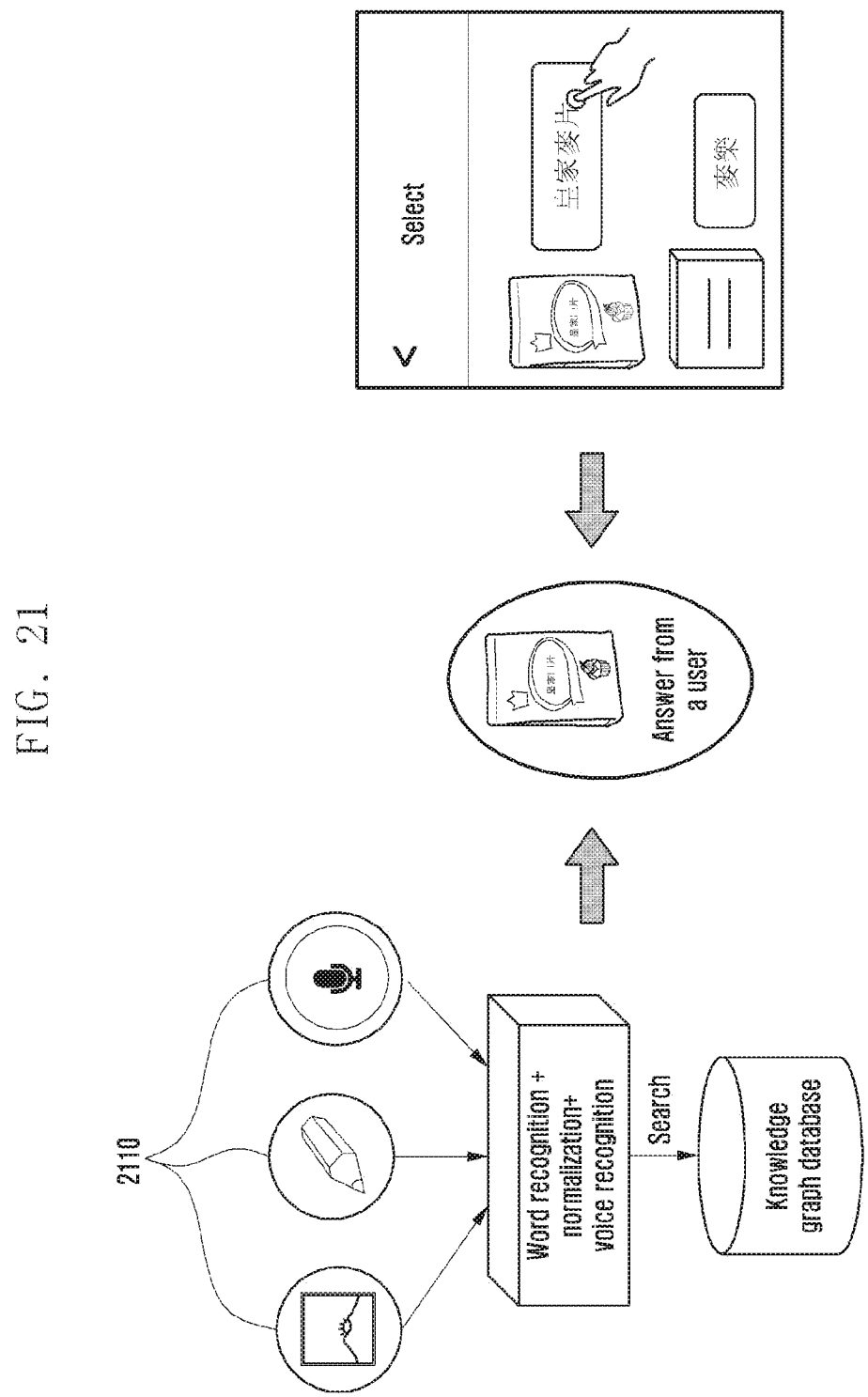
FIG. 21 illustrates a way of inputting an answer by an answering user according to the sixth embodiment of the present disclosure.

FIG. 21 illustrates a way of inputting an answer by an answering user according to the sixth embodiment of the present disclosure.

As illustrated in FIG. 21, after an answering user inputs multi-modal object information 2110, the system looks up a matched object from the knowledge graph after performing character recognition, text regularization and voice recognition.

In step 2, a user translation model is established, and translation results are updated according to the user translation model.

The method for establishing the user translation model includes classifying, after answers from answering users are collected, the answering users according to personal data of the answering users. Answers from each type of users are analyzed and ranked by counting the frequency of the answers. A weight corresponding to the ranking result is given to each answer. A user translation model with a crowdsourcing translation feedback weight, from a source object to a target object, is obtained. As shown in the example of FIG. 20, according to features and answers of users, the answering users are classified into three types. Answers from each type of users are analyzed and ranked, for calculating translation results from similar users for the next time.

The specific method for analyzing answers from the users includes, if it is detected that a translation result provided by a user is matched with a certain object in the existing knowledge database, increasing the number of times of the occurrence of a combination <source object, target object> by 1, if it is detected that a translation result provided by a user is matched with neither of the objects in the existing knowledge database, establishing a new object subject, and initializing the number of times of the occurrence of the combination <source object, target object> to 1.

When the translation system receives this request for object translation again, the requesting user is analyzed and classified as first. This translation result considers both machine translation candidates and translation candidates with a crowdsourcing translation feedback weight. Scores under such comprehensive consideration are calculated, and a final translation result is obtained.

The sixth embodiment of the present disclosure uses object-to-object machine translation on wearable apparatuses. When compared with a mobile apparatus, processing and displaying data is changed, and thus the characteristics of a wearable apparatus can be met. To be better adapted to the characteristics of multiple users and to better utilize the user data generated by multiple users, the present disclosure provides an object translation method based on multiple users, and establishes a feedback mechanism based on a large amount of user data to improve the quality of translation.

Seventh Embodiment

In consideration of the quality of machine translation highly depending upon the normalization degree of the input texts and the size of the database and model, the existing commercial machine translation technologies generally require support from network and cloud services, and normalized processing on texts. However, the existing machine translation technologies do not consider situations such as constrained network, inadequate electric power of an apparatus, and incomplete input text/voice/image information.

Figure 22:
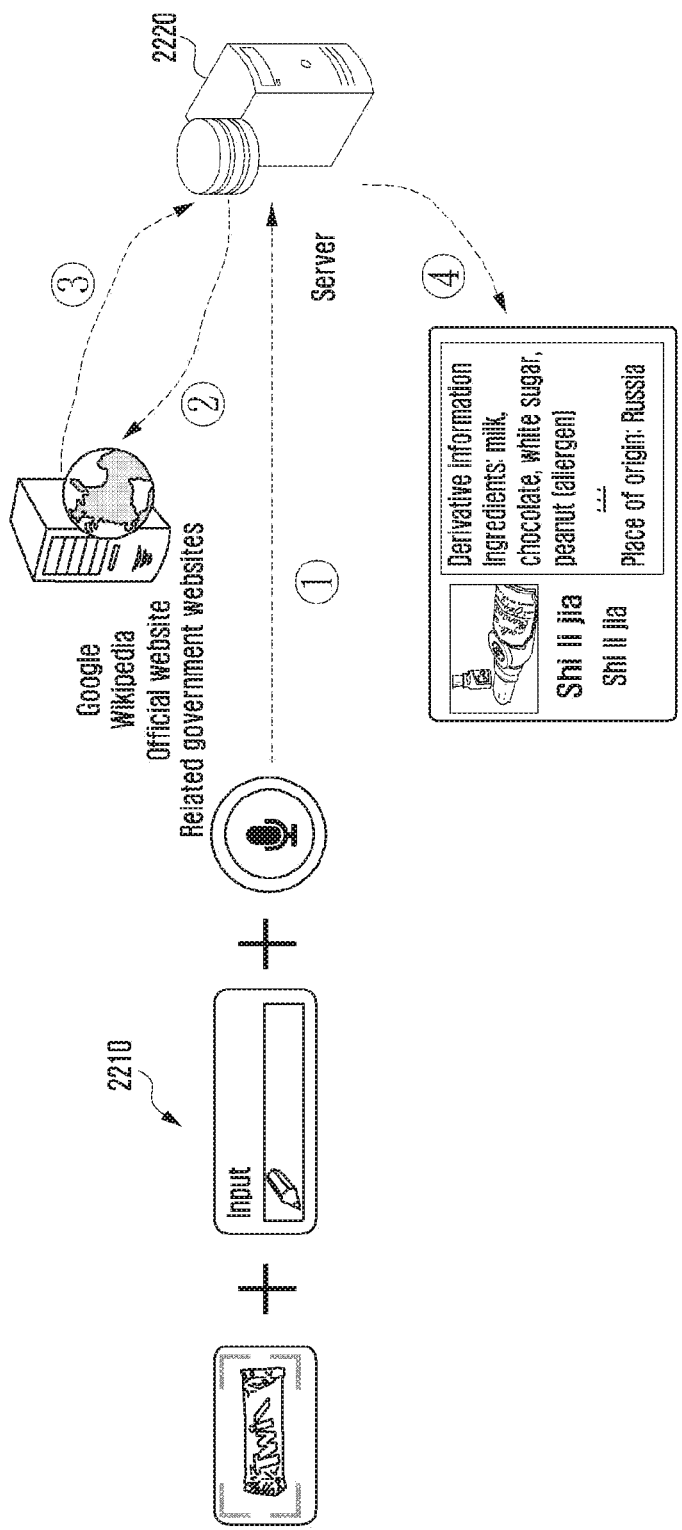
FIG. 22 illustrates normalizing incomplete input according to a seventh embodiment of the present disclosure.

Thus, FIG. 22 illustrates normalizing incomplete input according to a seventh embodiment of the present disclosure, which provides a solution for optimizing the method for translating object information in extreme conditions, including handling incomplete input object information, saving traffic and electric power, and outputting translation of object information by an apparatus in different conditions.

I. Normalization of Incomplete Input

In actual situations, there are situations where the input information may be incomplete, including an incomplete package of an object, blurred texts or images on the package of an object, or a small amount of uploaded information, such as information of a source picture, as shown in 2210 of FIG. 22. To ensure the accuracy of object translation results, the present disclosure provides a solution for permitting multi-modal information input and information completion, including collecting the multi-modal input information and analyzing and recognizing an object.

The terminal apparatus collects at least one of picture information, text information, and audio information. The information can be directly acquired by the apparatus or input by a user, Audio can be converted into texts and input to an object recognition system.

The analyzing and recognizing the object is identical to analyzing and recognizing an object as described in step S2 of the second embodiment. However, if the input source-object information is incomplete, when the system is unable to recognize a source object, step 3 is used.

In step 3, a search is enabled for related object information.

If the source-object information collected by the terminal apparatus is inadequate to recognize the object, a network search engine is enabled, or pictures and texts are looked up and matched in a database stored in advance in the terminal apparatus to obtain more pictures and texts related to this object. After the acquired picture information and text information are filtered and normalized, step 2 is performed. If the information is still inadequate to recognize the object, step 2 and step 3 are repeated until the system recognizes the object.

Specifically, if the score of the existing source-object information in an object recognition classifier is lower than a set threshold, the source-object information collected by the terminal apparatus is inadequate to recognize an object. In this case, the network search engine is enabled to look up and match pictures and texts. Thus, more pictures and texts about the object are obtained. After the acquired picture information and text information are filtered and normalized, step 2 is performed.

If the information is still inadequate to recognize the object, step 2 and step 3 are repeated until the system recognizes the object or the number of times of repetition exceeds an iterative threshold. The set threshold and iterative threshold belong to an empirical value.

With regard to the source picture as described in FIG. 22, the translation system extracts corresponding recognition features according to the picture, and the recognition features are classified and recognized in an object recognition system. If the recognition score is lower than a set threshold, a network search engine 2220 is enabled. The network search engine 2220 searches over the network according to the feature of this picture and returns the search results of a number currently set to the translation system. The features are extracted again and the above process is repeated until the recognition score is higher than the set threshold or the repeated search time exceeds the iterative threshold. The object with the highest score in the final recognition process is acquired as the recognition result.

II. Dish Translation

Figure 23A:
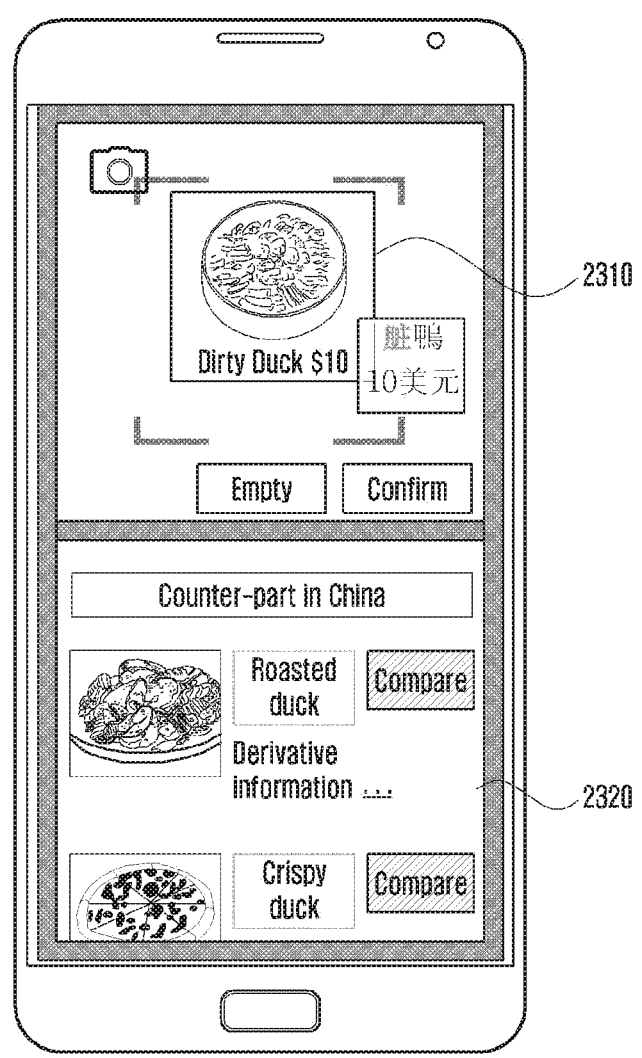
FIG. 23A, FIG. 23B, and FIG. 23C illustrate dish translation according to a specific embodiment of the seventh embodiment of the present disclosure.
Figure 23B:
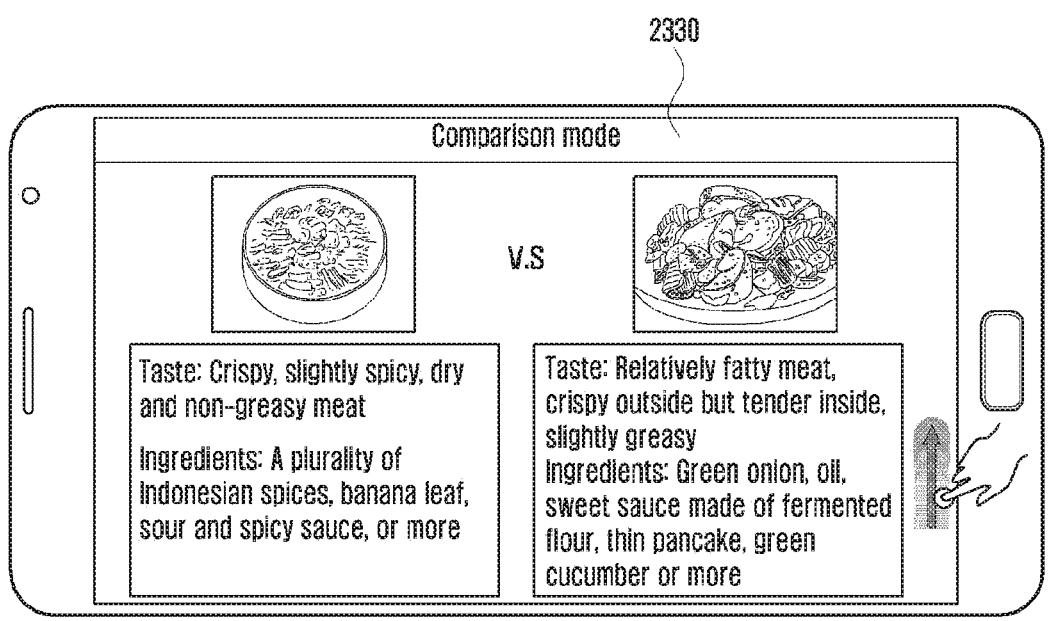
Figure 23C:
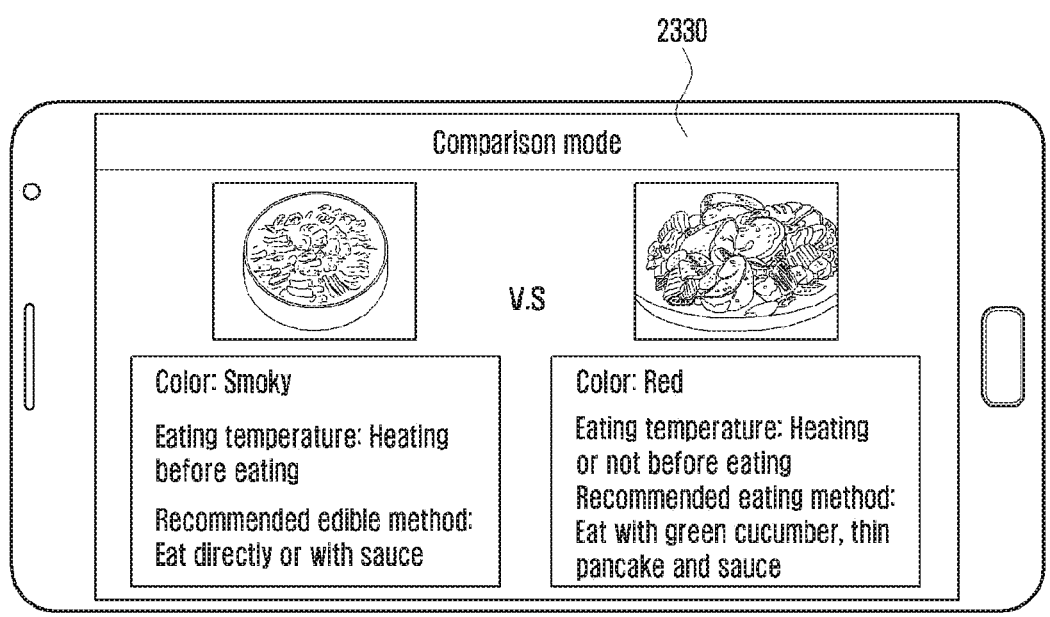

FIG. 23A, FIG. 23B, and FIG. 23C illustrate dish translation according to a specific embodiment of the seventh embodiment of the present disclosure. That is, when a user is dining, the user might want to have dishes and/or menus in a foreign language to be translated. In this case, if only the translation of a dish's name is provided, a user's requirements cannot be fully met. A corresponding dish in the local language is further required to be provided so as to explicitly provide information such as ingredients, flavor, and eating methods.

Specifically, dish (rice and cooked food) translation discussed in the seventh embodiment involves unpacked dishes and/or menus. Since information such as ingredients, allergens, energy, suitable audiences cannot be directly known, dish translation generally involves when the source information is incompletely input. A source dish is matched and recognized in the step described in the solution for normalizing incomplete input information. Then, based on features such as similarity between ingredients of dishes and flavor/scent/temperature, the translated target dish is displayed. The translation results can be ranked based on degree of matching.

In addition, as for dishes of which information such as names, ingredients, allergens, energy suitable users can be directly known, for example, packaged dishes (belonging to packaged foods), dishes with detailed description, the translation method thereof can refer to the solutions provided by the second to sixth embodiments. Translation of a famous dish "dirty duck" in Indonesia is taken as an example to explain a complete translation process.

As for existing dishes such as cooked foods, upon acquiring an object picture by source, the object picture is uploaded to the server. Then, by step 2 and step 3, the source object is detected to be "dirty duck" 2310 in Indonesia. Then, a picture feature, personalized information of a user, and more are acquired by step S1 of the second embodiment, to translate the source object to a dish with which the user is familiar. As shown in FIG. 23A, the system acquires the target language of the user as Chinese, and extracts the picture feature and the text feature (for example, food material: a whole duck; way of cooking: toasting, frying or more) of the "dirty duck" by the translation system described in step S2 of the second embodiment, and obtains, by the translation model, candidate translations of a plurality of Chinese dishes, for example, roasted duck, crispy duck (the picture feature and the text feature thereof are similar to those of the source object) 2320.

The terminal can also display derivative translation information, and the involved key information can be at least one of flavor, scent, temperature, color, ingredients, allergens, and cooking methods. Flavor includes, but is not limited to, at least one of sweet, salty, spicy, sour, and bitter, temperature includes, but is not limited to, at least one of icy, cold, warm, hot, very hot, and allergens include, but are not limited to, at least one of peanuts, soybeans, seafood, or more.

According to different personalized requirements, the system provides personalized translation results and derivative information in the step described in the method for translating personalized object information. For example, when the system detects that a user is allergic to a certain material or dislikes a certain flavor, allergic content, for example, an allergen, in the derivative translation is highlighted according to the solution for translating personalized object information. If it is detected that a user is allergic to peanuts, "peanut" is highlighted in ingredients of derivative information to alert the user. If it is detected that a user eats no pork, "pork" is highlighted in ingredients of derivative information to alert the user. If it is detected that a user eats no spicy foods, content about "spicy" is highlighted in the column "flavor" of derivative information. The method for the system to acquire allergic content such as whether a user is allergic to something and whether a user eats spicy foods is as described in the solution for translating personalized object information.

Based on a user's operation, key information of the dirty duck and key information of the roasted duck, for example, flavor, scent, temperature, color, ingredients, allergens, eating methods and cooking methods can be compared, as shown in 2330 of FIG. 23B and FIG. 23C. In the drawings, differences in derivative information between the "dirty duck" and the "roasted duck", for example, "taste", "ingredients", "color", "eating temperature", "recommended eating methods", are compared. For example, as for "taste", "dirty duck" is slightly spicy and the meat thereof is dry and non-greasy, while the meat of the "roasted duck" is relatively fatty and slightly greasy. As for ingredients, the "dirty duck" is cooked with a plurality of Indonesian spices, while the "roasted duck" is cooked with ingredients commonly found in China; and there are differences in color, eating temperature and eating methods. Comparing and displaying differences in such a manner enables a user to acquire useful information quickly and clearly, thus providing the user with a convenient and quick means for comparison.

Figure 24C:
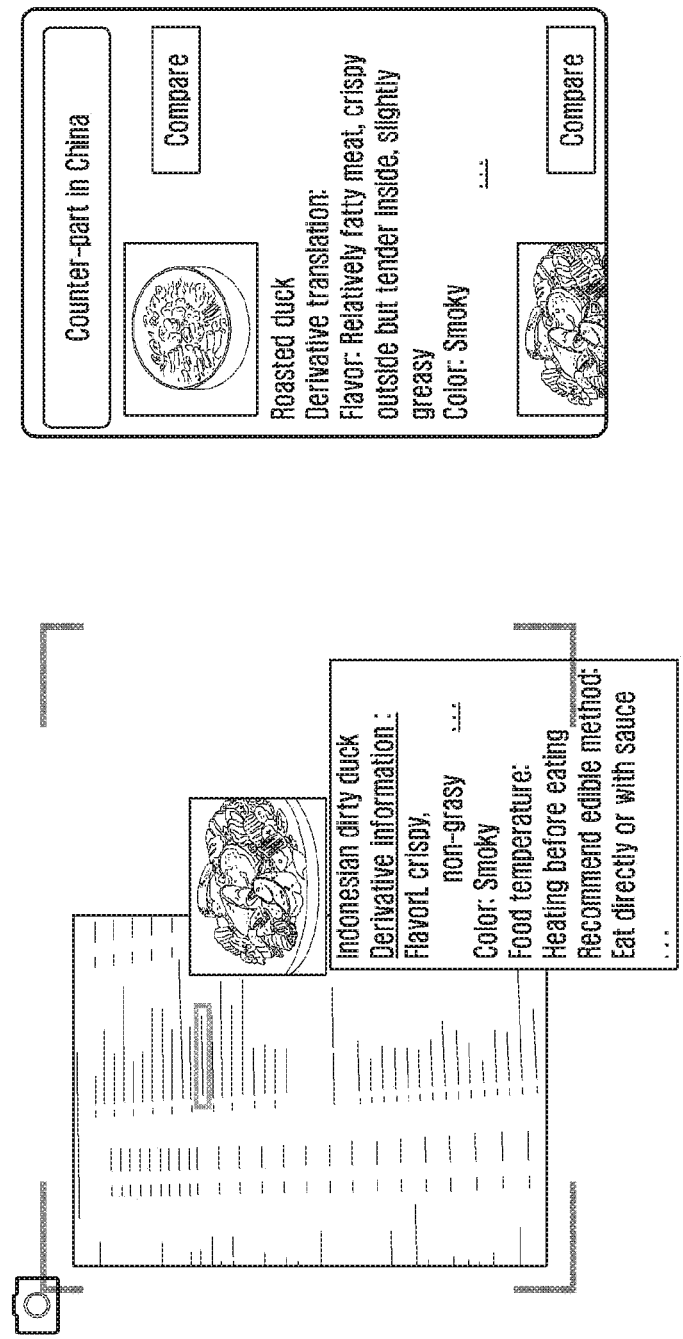

If a source object is input as a plain text, for example, a menu, as shown in FIG. 24A, incomplete descriptions of a plurality of objects are input. First, text recognition is performed on the name of each dish, and the name is matched with determined objects in the knowledge graph by step 2 and step 3, and pictures and derivative information thereof are output in the capture area of the source object of the terminal by AR, as described in the third embodiment. As shown in FIG. 24A and FIG. 24B, a target dish corresponding to the source dish and derivative information thereof are generated and output to the display area of the target object of the terminal by the solution for derivative translation in the first to six embodiments. Results of comparison between the derivative information of the source dish and the derivative information of the target dish can also be provided, by the solution for automatically comparing multiple source objects and the target object in the fourth embodiment. The translation results can be interactively operated by augment reality according to step 3 of the third embodiment, including but not limited to, after a certain dish name is selected in the capture area of the source object, displaying only translation results corresponding to the dish name in the display area of the target object; or after a certain dish name is selected in the capture area of the target object, the dish name corresponding to the source dish name is highlighted in the capture area of the source object, or more.

As illustrated in FIG. 24A, when the input objects are multiple dish names, translation results of the source dishes are displayed in the capture area of the source object by AR, as described in the third embodiment, and are provided in the display area of the target object according to step S4 of translating multiple objects in the second embodiment and the solution for derivative translation of multiple objects in the fourth embodiment. If the apparatus detects that a user performs a selection operation on a certain translation result, for example, as illustrated in FIG. 24B, when the apparatus detects that a user selects the "dirty duck", the operation including, but not limited to long pressing, clicking a certain translation result in the translation region of source dishes, long pressing, clicking a certain translation result of the target display area, and detailed information corresponding to the source dish (including pictures, derivative information or more) being automatically displayed in the capture area of the source object by AR. Information corresponding to a target dish in the display area of the target object is outputted according to the foregoing method, referring to FIG. 24B.

As for when a dish highly matched with the source dish cannot be found in the target language country, the system provides the most close translation result after taking all the features into consideration, and shows similarities and differences. For example, when "Sichuan hotpot" is translated into a Japanese dish, since there is no dish highly corresponding to hotpot in Japanese dishes, but by considering the color, cooking methods and eating methods, the most close translation results are provided, including sukiyaki, beef hotpot or more. Further, similarities and differences between the translation results and the source dish are provided in a comparison mode. For example, the similarities include food materials being put into a pot and cooked in soup, and the differences include flavor or ingredients.

III. Method for Saving Traffic and Electric Power

Figure 25:
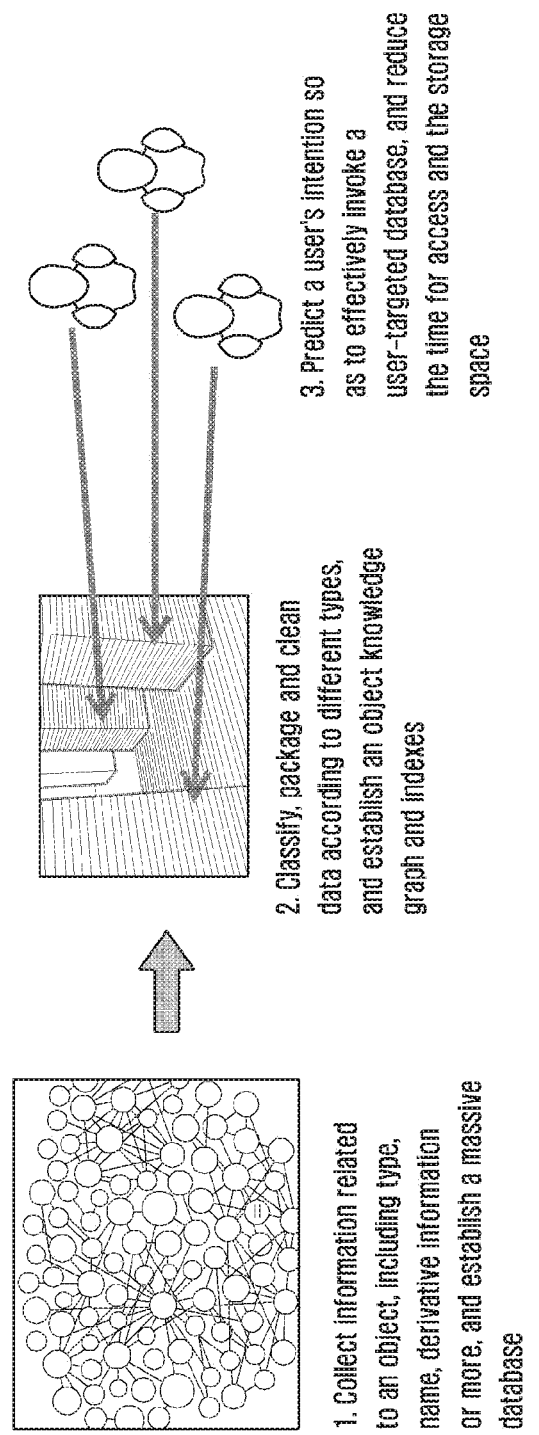
FIG. 25 illustrates a database downloaded and classified according to the user's intention according to the seventh embodiment of the present disclosure.

FIG. 25 illustrates a database downloaded and classified according to the user's intention according to the seventh embodiment of the present disclosure, which provides a solution for saving traffic and electric power to handle when there is no wifi or data traffic is constrained in the location of the terminal, when a user wishes to save data traffic and electric power, for example, incomplete wifi coverage in the destination of a travel abroad, and high expense of international data traffic. The process includes a user's intention being predicted, and information being downloaded in advance.

The terminal predicts a user's intention by detecting and analyzing at least one a user's schedule, hobbies, environment, and motion state.

Specifically, for example, the terminal acquires schedule information of a user by analyzing information recorded by a user's calendar and/or memo software, information regarding a user's interests and hobbies by analyzing information recorded by a user's mail box, text messages and/or call records, information of a user by a camera, a microphone, a sound sensor, a light sensor and/or a moisture sensor, and a user's motion state by a speed sensor. Possible action tracks and possible translation targets of a user can be predicted by information such as a user's schedule, hobbies, environment, and motion state. A predication model can be obtained by supervised learning.

When the terminal detects that it is currently in a wifi condition, the terminal prompts a user to download offline translation models and databases related to the destination and/or the translation target.

The step also includes steps of classifying, compressing and filtering the models and databases.

The databases are classified according to different types of objects, and can be divided into a food type, a drug type, a cosmetic type, a sports good type, and a signboard type for example, according to different translation scenes.

A translation model is filtered by entropy method/significance testing. A knowledge graph database is filtered by detecting and pruning redundant information. An audio database and a video database are compressed by coder and decoder systems such as AMER-EVS and H.265. A picture database is compressed in the format of joint picture experts group (JPEG).

When the terminal detects that it is currently in a wifi condition, the terminal prompts a user to download offline translation models and databases related to the destination and/or the translation target, which are classified, filtered and compressed by the foregoing steps.

As shown in FIG. 25, all the databases are classified, filtered and compressed according to the type, and an index is established. After the terminal detects a user's information, the server classifies the user's intentions and prompts the user to download corresponding databases when wifi is available.

In step 2, a database is used offline, and a simplified database can also be used offline.

When the terminal apparatus detects that data traffic is being used currently, the terminal apparatus gives priority to performing lookup and translation according to the downloaded models and databases, thereby reducing communication between the terminal and a cloud service. Because the size of the database is greatly reduced, a search space during translation is reduced, thereby avoiding a large amount of computation. Accordingly, the electric power is saved.

IV. Output Strategies in Different States

When the apparatus is in different network environments and different electric power conditions, the seventh embodiment of the present disclosure provides an optimal self-adaptive strategy, including a system operation platform, scale of a used model, and a multi-modal output form, for example, as shown in the following Table 1.

If the terminal apparatus is in wifi connection and with adequate electric power, the operation platform for this translation system is a remote server, the scale for the used model is the whole database, and the displaying of the translation result can be texts, images, audio and/or video. If the terminal apparatus is in non-wifi connection and with adequate electric power, the operation platform for this translation system is the terminal apparatus, the scale for the used model is the filtered database, and the displaying of the translation result can only be texts, images and/or audio. If the terminal is in wifi connection and with inadequate electric power, the operation platform for this translation system is a remote server, the scale for the used model is the whole database, and only texts and/or images are output as translation results. If the terminal apparatus is in non-wifi connection and with lower electric power, the translation system operates on the terminal apparatus, a filtered model is used, and only texts and/or images are output.

TABLE 1

| | Operation platform | | Scale of a model | | Multi-modal output | | | |
|---|---|---|---|---|---|---|---|---|
| | Mobile apparatus | Server | all | Filtered | Text | Image | Audio | Video |
| Wifi network available Adequate electric power | | √ | √ | | √ | √ | √ | √ |
| Wifi network unavailable Adequate electric power | √ | | | √ | √ | √ | √ | |
| Wifi network available Low electric power | | √ | √ | | √ | √ | | |
| Wifi network unavailable Low electric power | √ | | | √ | √ | √ | | |

The seventh embodiment of the present disclosure provides an optimization solution for various situations, including filtering and compressing a model and a database, judging in advance and downloading in advance, a solution for similarly matching in a case of incomplete input information, and presenting the translation results in low electric power. As such, robustness of the translation system is improved.

Eighth Embodiment

Based on the method for translating object information provided by the first embodiment, the eighth embodiment of the present disclosure provides a device for translating object information.

Figure 26:
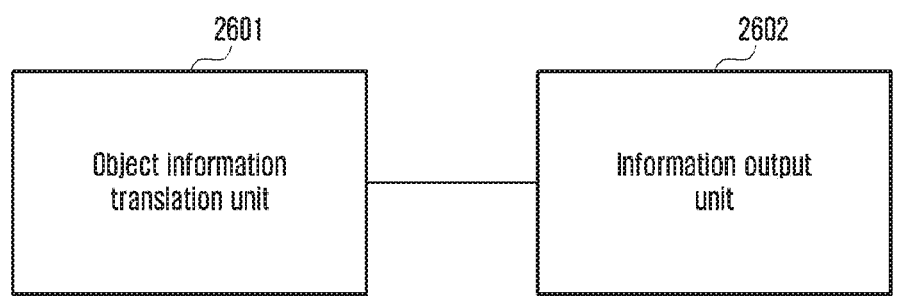
FIG. 26 illustrates a device for translating the object information according to an eighth embodiment of the present disclosure.

FIG. 26 illustrates a device for translating the object information according to an eighth embodiment of the present disclosure. As illustrated in FIG. 26, an object information translation unit 2601 and an information output unit 2602 are provided.

The object information translation unit 2601 is configured to obtain, based on the acquired source-object information, the target-object information corresponding to the source object, and to recognize one or more source objects to be translated based on the acquired source-object information.

The information output unit 2602 is configured to output the target-object information obtained by the object information translation unit 2601 by translation.

In the present disclosure, implementations of specific functions of the units in the device for translating object information provided in the eighth embodiment can refer to the specific steps of the method for translating object information provided in the first embodiment, and will not be repeated here.

Ninth Embodiment

Figure 27:
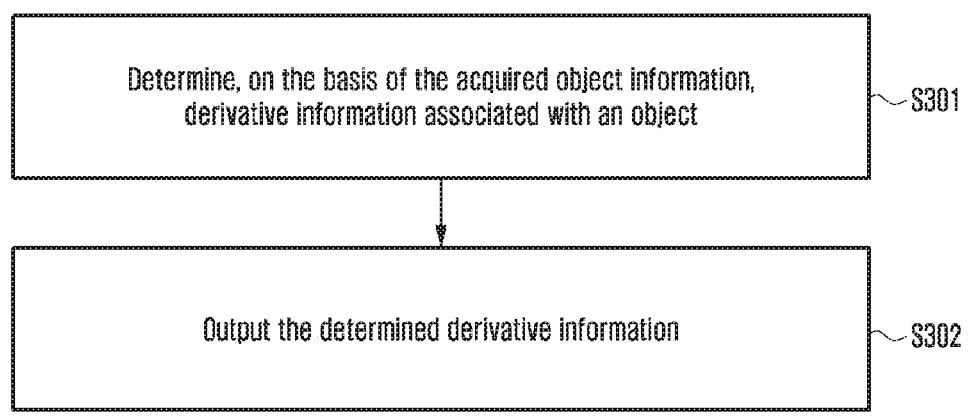
FIG. 27 illustrates a method for acquiring derivative information according to a ninth embodiment of the present disclosure.

FIG. 27 illustrates a method for acquiring derivative information according to a ninth embodiment of the present disclosure. As shown in FIG. 27, the specific flow thereof includes the following steps.

In step S301, the derivative information associated with an object is acquired based on the acquired object information.

Specifically, a corresponding object can be recognized based on the acquired object information. The acquired object information can include at least one of texts, pictures, audio, and video.

In actual applications, the object information can be directly acquired by a terminal, for example, the object information can be captured and acquired by shooting by a camera. Alternatively, the transferred object information can be acquired from network or other apparatuses. The acquired object information can include at least one of multimedia information corresponding to an object, text information recognized from the multimedia information corresponding to an object, location information corresponding to an object, searched related information of a source object, and related information of an object input by a user. For example, the acquired object information can be a picture collected in real time, and derivative information corresponding to the picture is generated in real time by the solution provided by the ninth embodiment of the present disclosure.

A corresponding object is recognized based on the acquired object information and can refer to the first and second embodiments of the present disclosure, and will not be repeated here.

After the object is recognized, the attribute information corresponding to a preset attribute of the recognized object can be searched from a preset object knowledge graph database, and the searched attribute information is determined as the derivative information associated with the object. The preset attribute is determined according to the type of objects.

Alternatively, the derivative information associated with the object can also be determined based on the location information corresponding to the object.

In actual applications, when there is a plurality of recognized objects which belong to a combined object of an identical type, the derivative information associated with the object can be determined by at least one of determining, for the combined object corresponding to the plurality of objects, the derivative information associated with the combined object, and respectively acquiring, for the plurality of objects, the derivative information respectively associated with each object.

In step S302, the determined derivative information is output.

That is, the language environment corresponding to the acquired derivative information can be determined according to the personal information of a user, and the derivative information can be displayed based on the determined language environment.

The derivative information to be prominently displayed can also be positioned according to the personal information of a user, and the positioned derivative information is prominently displayed.

A related reminder event can also be generated or altered according to the personal information of a user and/or the acquired derivative information.

Determining derivative information of an object in the ninth embodiment can refer to determining related derivative information in the first embodiment, the fourth embodiment and the fifth embodiment, and will not be repeated here.

Figure 28:
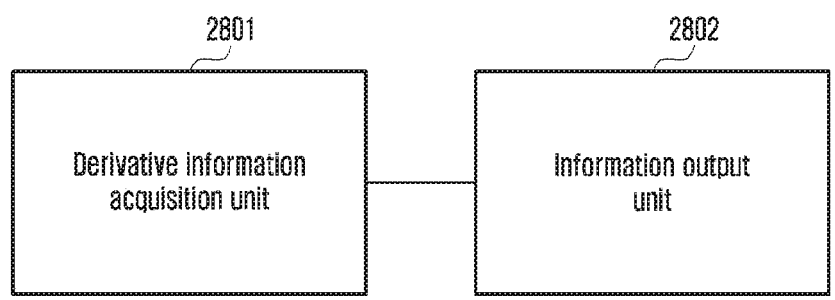
FIG. 28 illustrates a device for acquiring derivative information according to the ninth embodiment of the present disclosure.

FIG. 28 illustrates a device for acquiring derivative information according to the ninth embodiment of the present disclosure.

As illustrated in FIG. 28, a derivative information acquisition unit 2801 and an information output unit 2802 are included.

The derivative information acquisition unit 2801 is configured to determine, based on the acquired object information, the derivative information associated with the object.

The information output unit 2802 is configured to output the derivative information determined by the derivative information acquisition unit 2801.

In the present disclosure, implementations of specific functions of each unit in the device for acquiring derivative information provided by the ninth embodiment can refer to the specific steps of the method for translating object information provided by the first embodiment and specific steps of the method for acquiring information provided by the ninth embodiment, and will not be repeated here.

The technical solutions provided by the present disclosure can translate an object itself but not only texts. Thus, the problem that translation of texts is incapable of completely covering a translation task can be effectively avoided. By establishing an object alignment mode in advance, foreign objects with which a user is unfamiliar can be translated into corresponding domestic objects with which a user is familiar; or the translation orientation can be exchanged to translate domestic objects into corresponding objects of target countries. When compared with the fact that the existing translation subjects are texts only, the technical solutions provided by the present disclosure can meet a user's requirements on translation of objects, expand the range of machine translation subjects, and enhance the applicability of translation.

The present disclosure provides a concept of derivative translation based on object-to-object translation. When compared with the existing passive translation, in the present disclosure, not only literal translation information of a source object can be provided, a target object corresponding to the source object can also be analyzed to provide derivative information related to the target object. The translated content is supplemented to enhance a user's understanding of the translated content.

The present disclosure can also adjust the translated content according to location information of the occurrence of translation, information of a user, the type of a terminal apparatus to meet a user's different actual requirements on translation.

The present disclosure provides a method for using object-to-object machine translation on wearable apparatuses. When compared with a mobile apparatus, the way of processing and displaying data is changed, and thus the characteristics of a wearable apparatus can be met.

To be better adapted to the characteristics of multiple users and to better utilize user data generated by multiple users, the present disclosure provides an object translation method based on multiple users, and establishes a feedback mechanism based on a large amount of user data to improve the quality of translation.

The present disclosure provides an optimization solution for various situations, including: a solution for filtering and compressing a model and a database, a solution for judging in advance and downloading in advance, a solution for similarly matching in a case of incomplete input information, a solution for presenting the translation results in low electric power. Accordingly, robustness of the translation system is improved.

Those skilled in the art will understand that the present disclosure involves apparatuses for performing one or more of operations as described in the present disclosure. Those apparatuses may be specially designed and manufactured as intended, or may include well known apparatuses in a general-purpose computer. Those apparatuses have computer programs stored therein, which are selectively activated or reconstructed. Such computer programs may be stored in device (for example computer) readable media or in any type of media suitable for storing electronic instructions and respectively coupled to a bus, and the computer readable media include but are not limited to any type of disks (including floppy disks, hard disks, optical disks, CD-ROM and magneto optical disks), ROM (read-only memory), RAM (random access memory), EPROM (erasable programmable ROM), EEPROM (electrically erasable programmable ROM), flash memories, magnetic cards or optical line cards. That is, readable media include any media storing or transmitting information in a device (for example, computer) readable form. That is, readable media include any media storing or transmitting information in an apparatus (for example, computer) readable form.

Those skilled in the art will understand that computer program instructions may be used to realize each block in structure diagrams and/or block diagrams and/or flowcharts as well as a combination of blocks in the structure diagrams and/or block diagrams and/or flowcharts. It may be understood by those skilled in the art that these computer program instructions may be provided to general purpose computers, special purpose computers or other processors of programmable data processing means to be implemented, so that solutions designated in a block or blocks of the structure diagrams and/or block diagrams and/or flow diagrams are executed by computers or other processors of programmable data processing means.

Those skilled in the art will understand that the operations, methods, steps in the flows, measures and solutions already discussed in the present disclosure may be alternated, changed, combined or deleted. The operations, methods, other steps in the flows, measures and solutions already discussed in the present disclosure may also be alternated, changed, rearranged, decomposed, combined or deleted. Prior art having the operations, methods, the steps in the flows, measures and solutions already discussed in the present disclosure may also be alternated, changed, rearranged, decomposed, combined or deleted.

While the present disclosure has been particularly shown and described with reference to certain embodiments thereof, it will be understood by those of ordinary skill in the art that various changes in form and details may be made therein without departing from the spirit and scope of the present disclosure as defined by the following claims and their equivalents.

What is claimed is:

1. A method by a device comprising:
acquiring source multimedia information of a source product, the source multimedia information including information associated with at least one of an image feature, a logo feature and a text feature associated with the source product;
identifying the source product based on the source multimedia information;
obtaining target information of a target product corresponding to the source product based on location information of the device, the target product being obtainable in a locale corresponding to the location information; and
displaying, on a display, the target information based on personal information associated with requirements of the user, the target information including information associated with at least one of an image feature, a logo feature, a text feature, and a specification associated with the target product;
wherein the displayed target information includes a part of the information being highlighted based on the requirements.

2. The method of claim 1, wherein identifying the source object comprises:
extracting, based on the source multimedia information, at least one of the image feature, the logo feature and the text feature associated with the source product; and
identifying the source product according to the at least one of the extracted image feature, logo feature and text feature associated with the source product.

3. The method of claim 1, wherein obtaining the target information comprises:
determining language environments respectively corresponding to the source product and the target product; and
obtaining, based on the language environments respectively corresponding to the source product and the target product, the target information.

4. The method of claim 1, wherein the source multimedia information further comprises at least one of:
multimedia information corresponding to the source product;
text information recognized from the multimedia information corresponding to the source product;
location information corresponding to the source product;
searched related information of the source product; and
related information of the source product input by a user.

5. The method of claim 1, wherein displaying the target product comprises:
collecting multimedia information in real time by a multimedia collection apparatus; and
positioning, from the multimedia information collected in real time, the target product corresponding to the source product.

6. The method of claim 1, wherein obtaining the target information of the target product comprises:
searching attribute information corresponding to a preset attribute of the target product; and
determining the searched attribute information as the information associated with the specification.

7. The method of claim 1, wherein obtaining the target product comprises:
determining the target information based on the location information of the device and location information of the target product.

8. The method of claim 1, wherein displaying the target product comprises:
displaying at least one piece of information of at least one candidate target product;
receiving an input signal for selecting at least one target product among the at least one candidate target product;
determining the selected target product as the target product corresponding to the source product; and
transmitting, to a server, information associated with the selected target product and the source multimedia information,
wherein the at least one piece of information of the at least one candidate target product is displayed based on a priority order of the at least one candidate target product.

9. The method of claim 1, wherein identifying the source product comprises:
displaying at least one piece of information of at least one candidate source product;
receiving an input signal for selecting at least one piece of information among the at least one piece of information of the at least one candidate source product; and
identifying the source product based on the selected at least one piece of information.

10. The method of claim 1, wherein the personal information includes information associated with a language of the user, and
wherein the personal information associated with the requirements includes at least one of a schedule, interests, hobbies, environment, motion state, and health state of the user.

11. A device comprising:
at least on processor configured to:
acquire source multimedia information of a source product, the source multimedia information including information associated with at least one of an image feature, a logo feature and a text feature associated with the source product,
identify the source product based on the source multimedia information,
obtain target information of a target product corresponding to the source product based on location information of the device, the target product being obtainable in a locale corresponding to the location information, and
a display configured to display the target information based on personal information associated with requirements of the user, the target information including information associated with at least one of an image feature, a logo feature, a text feature, and a specification associated with the target product,
wherein the displayed target information includes a part of the information being highlighted based on the requirements of the user.

12. The device of claim 11, wherein the at least one processor is further configured to:
extract at least one of the image feature, the logo feature, and the text feature associated with the source product, based on the source multimedia information, and
identify the source object according to the at least one of the extracted image feature, the logo feature, and the text feature.

13. The device of claim 11, wherein the at least one processor is further configured to:

determine language environments respectively corresponding to the source product and the target product, and obtain the target information, based on the language environments respectively corresponding to the source product and the target product.

14. The device of claim 11, wherein the source multimedia information further comprises at least one of:

multimedia information corresponding to the source product;

text information recognized from the multimedia information corresponding to the source product;

location information corresponding to the source product;

searched related information of the source product; and related information of the source product input by a user.

15. The device of claim 11, wherein the at least one processor is further configured to:

collect multimedia information in real time by a multimedia collection apparatus, and position, from the multimedia information collected in real time, the target product corresponding to the source product.

16. The device of claim 11, wherein the at least one processor is further configured to:

search attribute information corresponding to a preset attribute of the target product, and determine the searched attribute information corresponding to the preset attribute of the target product as the information associated with the specification.

17. The device of claim 11, wherein the at least one processor is further configured to:

determine the target information, based on the location information of the device and location information of the target product.

18. The device of claim 11, wherein the at least one processor is configured to:

control the display to display at least one piece of information of at least one candidate target product, receive an input signal for selecting at least one target product among the at least one candidate target product, determine the selected target product as the target product corresponding to the source product, and transmit, to a server, information associated with the selected target product and the source multimedia information, wherein the at least one piece of information of the at least one candidate target product is displayed based on a priority order of the at least one candidate target product.

19. The device of claim 11, wherein the at least one processor is further configured to:

control the display to display at least one piece of information of at least one candidate source product, receive an input signal for selecting at least one piece of information among the at least one piece of information of the at least one candidate source product, and identify the source product based on the selected at least one piece of information.

20. The device of claim 11, wherein the personal information includes information associated with a language of the user, and wherein the personal information associated with the requirements includes at least one of a schedule, interests, hobbies, environment, motion state, and health state of the user.

* * * * *